United States Patent
Hosseini et al.

(10) Patent No.: US 12,200,701 B2
(45) Date of Patent: Jan. 14, 2025

(54) REQUESTING AND REPORTING INFORMATION FOR SCHEDULER USER EQUIPMENT

(71) Applicant: QUALCOMM Incorporated, San Diego, CA (US)

(72) Inventors: Seyedkianoush Hosseini, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/446,792

(22) Filed: Sep. 2, 2021

(65) Prior Publication Data

US 2022/0070849 A1 Mar. 3, 2022

Related U.S. Application Data

(60) Provisional application No. 62/706,701, filed on Sep. 3, 2020.

(51) Int. Cl.
*H04W 72/20* (2023.01)
(52) U.S. Cl.
CPC .................... *H04W 72/20* (2023.01)
(58) Field of Classification Search
CPC ......... H04W 72/20; H04L 12/28; H04L 12/50
USPC ................. 370/329, 400, 401, 403
See application file for complete search history.

(56) References Cited

U.S. PATENT DOCUMENTS

| | | | |
|---|---|---|---|
| 2018/0049193 A1* | 2/2018 | Belleschi | H04W 72/0446 |
| 2018/0295646 A1 | 10/2018 | Faurie et al. | |
| 2019/0052436 A1* | 2/2019 | Desai | H04W 72/0446 |
| 2020/0029318 A1 | 1/2020 | Guo | |
| 2020/0229198 A1 | 7/2020 | Kung et al. | |
| 2020/0275425 A1 | 8/2020 | Cao et al. | |
| 2023/0082996 A1* | 3/2023 | Sarkis | H04L 1/1896 |
| | | | 370/329 |

FOREIGN PATENT DOCUMENTS

WO 2020153721 A1 7/2020

OTHER PUBLICATIONS

International Search Report and Written Opinion—PCT/US2021/071367—ISA/EPO—Dec. 22, 2021.

* cited by examiner

*Primary Examiner* — Dang T Ton
(74) *Attorney, Agent, or Firm* — Harrity & Harrity, LLP

(57) ABSTRACT

Various aspects of the present disclosure generally relate to wireless communication. In some aspects, a first user equipment (UE) may transmit, to a second UE, a request for a sidelink resource allocation. The first UE may receive, from the second UE, scheduling information identifying the sidelink resource allocation based at least in part on the request. Numerous other aspects are provided.

30 Claims, 15 Drawing Sheets

| Request for SL resource allocation | | |
|---|---|---|
| Priority level(s) | PDB(s) | Periodic or aperiodic resources |
| Number of blind ReTX occasions per transmission | HARQ feedback indicator | BSR |
| UE ID(s) | Carrier index | Res. pool index |
| Beam index | One-bit indicator | |

FIG. 6A

| Scheduling information | | |
|---|---|---|
| Priority level(s) | T/F resource assignment per priority | Number of resources per priority |
| Reservation periodicity per priority | CBR index per priority | UE ID(s) |
| Max MCS/ layers | Carrier index | Res. pool index |
| Beam index | Blind or HARQ feedback based ReTX | |

FIG. 6B

REQUESTING AND REPORTING INFORMATION FOR SCHEDULER USER EQUIPMENT

CROSS-REFERENCE TO RELATED APPLICATION

This Patent Application claims priority to U.S. Provisional Patent Application No. 62/706,701, filed on Sep. 3, 2020, entitled "REQUESTING AND REPORTING INFORMATION FOR SCHEDULER USER EQUIPMENT," and assigned to the assignee hereof. The disclosure of the prior Application is considered part of and is incorporated by reference into this Patent Application

INTRODUCTION

Aspects of the present disclosure generally relate to wireless communication and to techniques and apparatuses for sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first UE includes transmitting, to a second UE, a request for a sidelink resource allocation. In some aspects, the method includes receiving, from the second UE, scheduling information identifying the sidelink resource allocation based at least in part on the request.

In some aspects, a method of wireless communication performed by a first UE includes receiving, from a second UE, a request for a sidelink resource allocation to be selected by the first UE. In some aspects, the method includes transmitting, to the second UE, scheduling information identifying the sidelink resource allocation based at least in part on the request.

In some aspects, a first UE for wireless communication includes a memory; and one or more processors coupled to the memory. The memory and the one or more processors may be configured to transmit, to a second UE, a request for a sidelink resource allocation. The memory and the one or more processors may be configured to receive, from the second UE, scheduling information identifying the sidelink resource allocation based at least in part on the request.

In some aspects, a first UE for wireless communication includes a memory; and one or more processors coupled to the memory. The memory and the one or more processors may be configured to receive, from a second UE, a request for a sidelink resource allocation to be selected by the first UE. The memory and the one or more processors may be configured to transmit, to the second UE, scheduling information identifying the sidelink resource allocation based at least in part on the request.

In some aspects, a non-transitory computer-readable medium storing a set of instructions for wireless communication includes one or more instructions that, when executed by one or more processors of a first UE, cause the first UE to transmit, to a second UE, a request for a sidelink resource allocation. The one or more instructions may cause the first UE to receive, from the second UE, scheduling information identifying the sidelink resource allocation based at least in part on the request.

In some aspects, a non-transitory computer-readable medium storing a set of instructions for wireless communication includes one or more instructions that, when executed by one or more processors of a first UE, cause the first UE to receive, from a second UE, a request for a sidelink resource allocation to be selected by the first UE. The one or more instructions may cause the first UE to transmit, to the second UE, scheduling information identifying the sidelink resource allocation based at least in part on the request.

In some aspects, an apparatus for wireless communication includes means for transmitting, to a UE, a request for a sidelink resource allocation to be selected by the UE and means for receiving, from the UE, scheduling information identifying the sidelink resource allocation based at least in part on the request.

In some aspects, an apparatus for wireless communication includes means for receiving, from a UE, a request for a sidelink resource allocation to be selected by the apparatus and means for transmitting, to the UE, scheduling information identifying the sidelink resource allocation based at least in part on the request.

In some aspects, a method of wireless communication performed by a base station includes receiving, from a first UE, a request for a sidelink resource allocation for a second UE. The method may include assigning the sidelink resource allocation for the second UE. The method may include transmitting scheduling information indicating the sidelink resource allocation to the first UE.

In some aspects, a base station for wireless communication includes a memory; and one or more processors coupled to the memory. The memory and the one or more processors may be configured to receive, from a first UE, a request for a sidelink resource allocation for a second UE. The memory and the one or more processors may be configured to assign the sidelink resource allocation for the second UE. The memory and the one or more processors may be configured to transmit scheduling information indicating the sidelink resource allocation to the first UE.

In some aspects, a non-transitory computer-readable medium storing a set of instructions for wireless communication includes one or more instructions that, when executed by one or more processors of a base station, cause the base station to receive, from a first UE, a request for a sidelink resource allocation for a second UE. The one or more instructions may cause the base station to assign the sidelink resource allocation for the second UE. The one or more instructions may cause the base station to transmit scheduling information indicating the sidelink resource allocation to the first UE.

In some aspects, an apparatus for wireless communication includes means for receiving, from a first UE, a request for a sidelink resource allocation for a second UE. The apparatus may include means for assigning the sidelink resource allocation for the second UE. The apparatus may include means for transmitting scheduling information indicating the sidelink resource allocation to the first UE.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A and 6B are diagrams illustrating examples of a request for a sidelink resource allocation and scheduling information based at least in part on the request, in accordance with the present disclosure.

DETAILED DESCRIPTION

Figure 1:
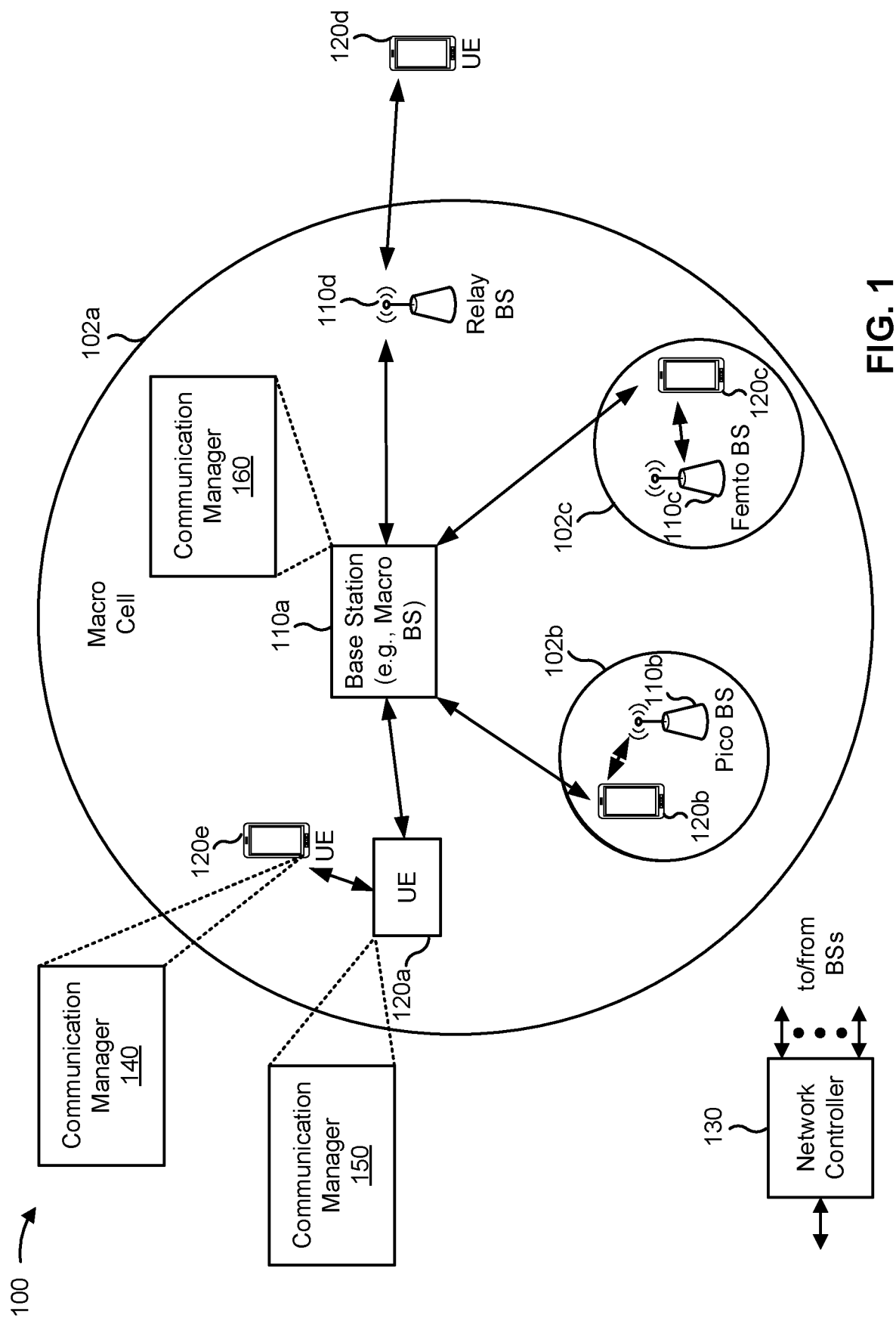
FIG. 1 is a diagram illustrating an example of a wireless network, in accordance with the present disclosure.

Sidelink communication provides for communication between UEs. A sidelink deployment can be centrally scheduled or can be scheduled by the UEs included in the sidelink deployment. A first UE (e.g., a sidelink transmit UE) may transmit data to a second UE (e.g., a sidelink receive UE) on a sidelink resource identified by a sidelink resource allocation. The first UE and/or the second UE may be low-capability UEs (e.g., reduced capability (RedCap) UEs, Internet of Things UEs, machine-type communication UEs, low-power UEs, UEs associated with diminished radio frequency capabilities, or similar UEs), wearable devices, and/or the like (though the techniques described herein are not limited to such UEs). The second UE may monitor a plurality of sidelink resources (e.g., sub-channels) to receive the data from the first UE. The request, and the corresponding sidelink resource allocation, may be associated with various parameters which may vary from allocation to allocation. While the content of the request and the scheduling information on the radio access interface (e.g., the Uu interface) is well defined, the content of the request and the scheduling information on the sidelink interface (e.g., the ProSe Sidelink (PC5)) interface, may not be well defined. Furthermore, different UEs may be associated with different capabilities, and different approaches can be used for sidelink scheduling (e.g., Mode 1 versus Mode 2).

Some techniques and apparatuses described herein provide content for a request and scheduling information associated with the request. For example, some techniques and apparatuses described herein provide various types of information for the request or the scheduling information to include, such as a priority level of a communication, various parameters for the communication (which can be mapped to the priority level), information regarding retransmission of a transmission using the sidelink resource allocation, and a beam, carrier, or resource pool information associated with the transmission using the sidelink resource allocation. In this way, efficiency of sidelink scheduling and resource allocation is improved, which improves utilization of UE communication resources and conserves processing resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FRI is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FRI and FR2 may be modified, and techniques described herein are applicable to those modified frequency ranges.

As shown in FIG. 1, the UE 120*e* may include a communication manager 140. As described in more detail elsewhere herein, the communication manager 140 may provide means for receiving, from a second UE, a request for a sidelink resource allocation to be selected by the first UE; means for transmitting, to the second UE, scheduling information identifying the sidelink resource allocation based at least in part on the request. Additionally, or alternatively, the communication manager 140 may perform one or more other operations described herein.

As shown in FIG. 1, the UE 120*a* may include a communication manager 150. As described in more detail elsewhere herein, the communication manager 150 may provide means for transmitting, to a second UE, a request for a sidelink resource allocation; means for receiving, from the second UE, scheduling information identifying the sidelink resource allocation based at least in part on the request. Additionally, or alternatively, the communication manager 150 may perform one or more other operations described herein.

As shown in FIG. 1, the BS 110 (e.g., BS 110*a*) may include a communication manager 160. As described in more detail elsewhere herein, the communication manager 160 may provide means for transmitting, to a second UE, a request for a sidelink resource allocation; means for receiving, from the second UE, scheduling information identifying the sidelink resource allocation based at least in part on the request. Additionally, or alternatively, the communication manager 160 may perform one or more other operations described herein.

As indicated above, FIG. 1 is provided merely as an example. Other examples may differ from what is described with regard to FIG. 1.

Figure 2:
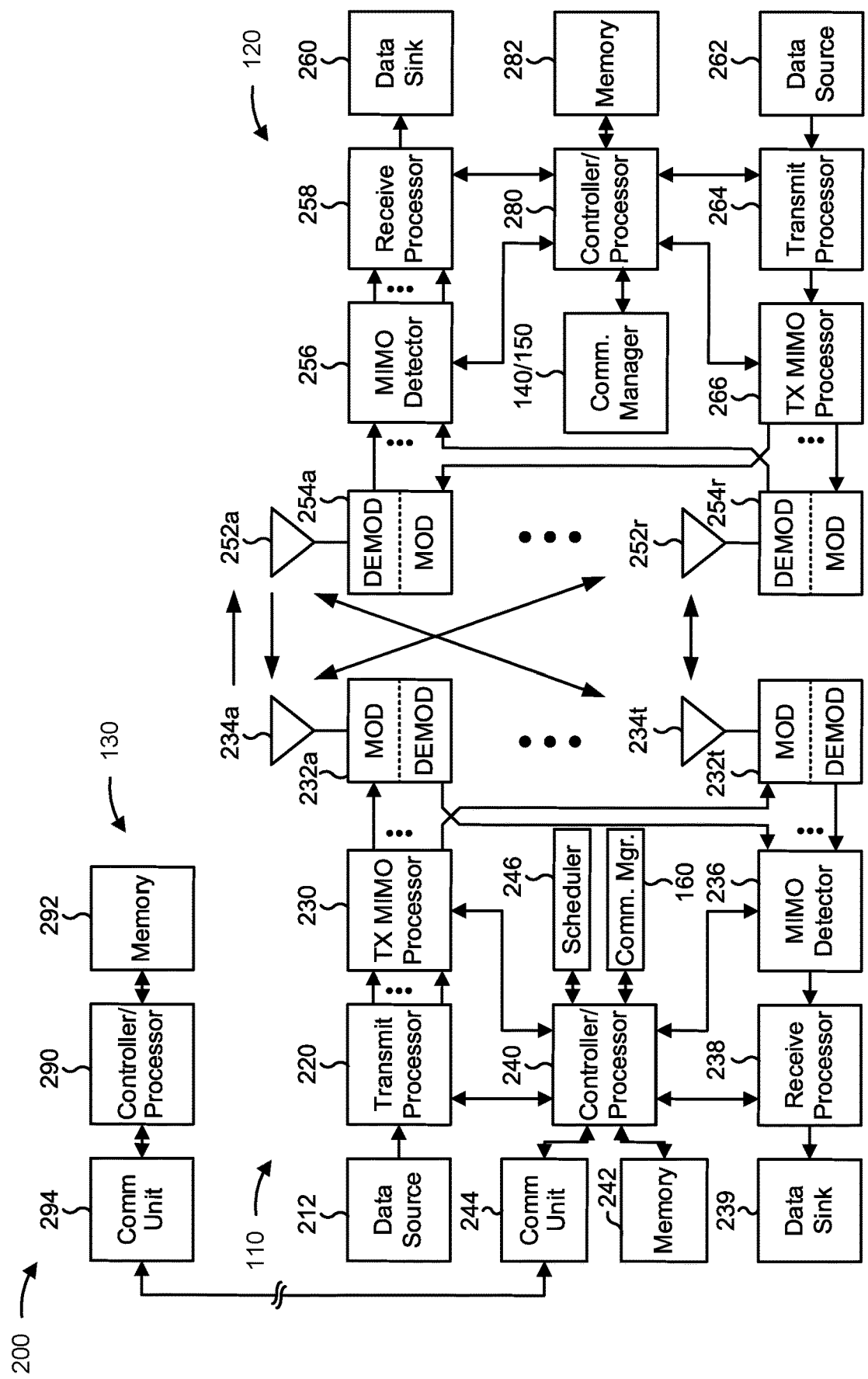
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with sidelink communication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 provides means for transmitting, to a second UE, a request for a sidelink resource allocation; means for receiving, from the second UE, scheduling information identifying the sidelink resource allocation based at least in part on the request means for receiving, from a second UE, a request for a sidelink resource allocation to be selected by the first UE; means for transmitting, to the second UE, scheduling information identifying the sidelink resource allocation based at least in part on the request; and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
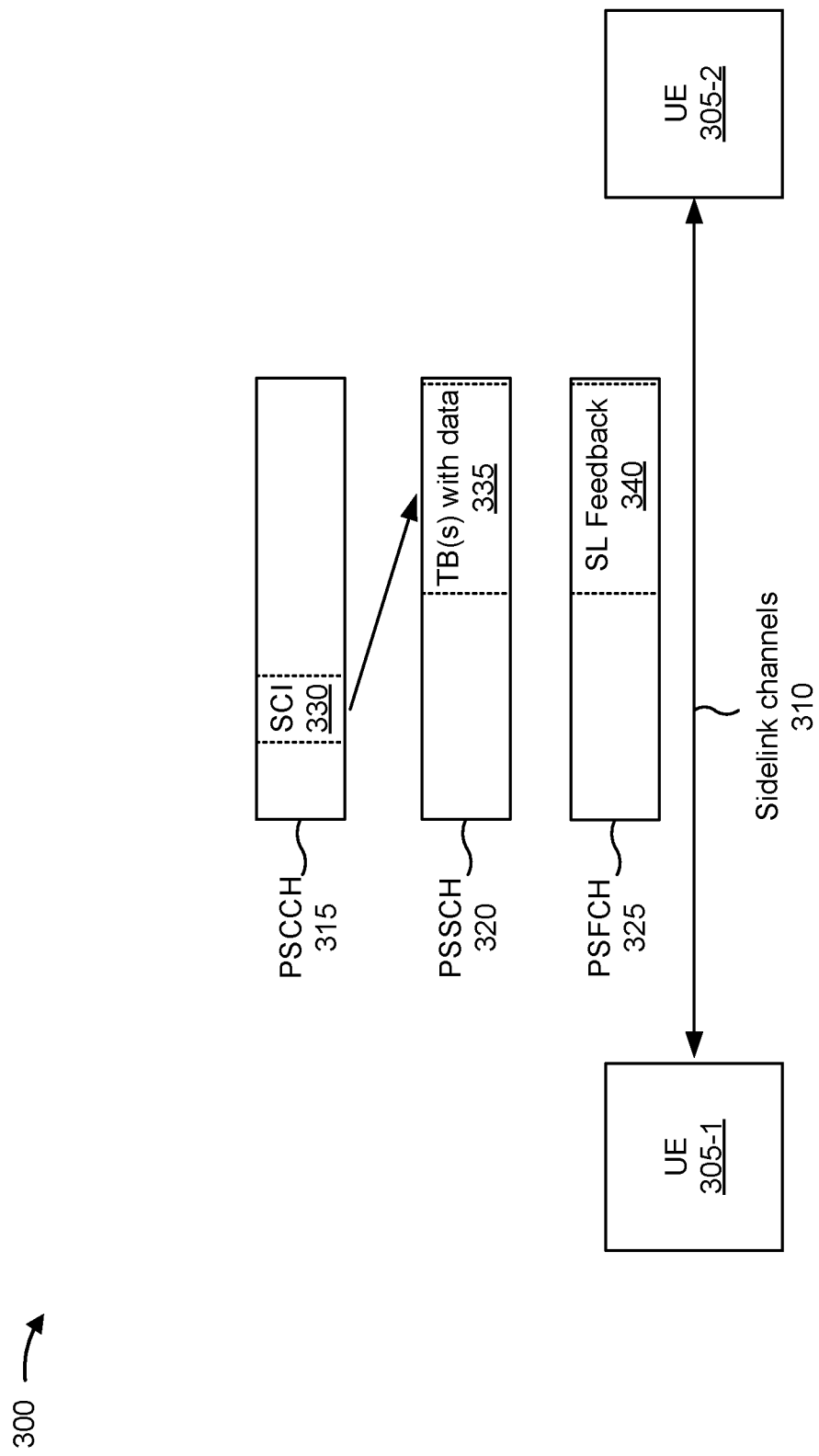
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
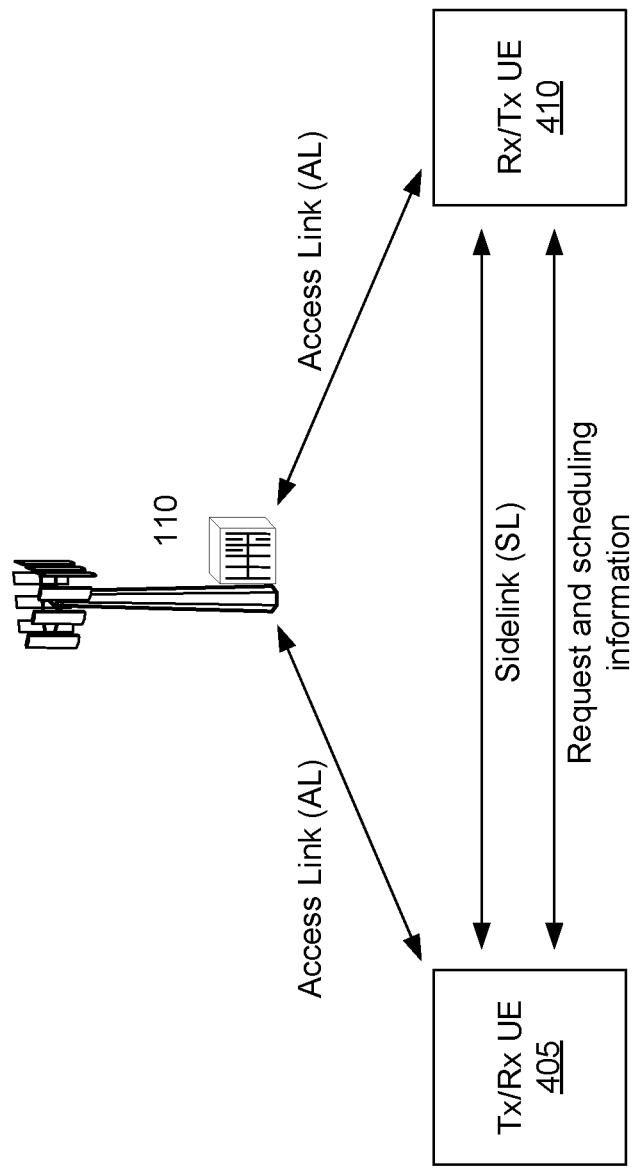
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications, which may include requests for sidelink resource allocations and scheduling information indicating sidelink resource allocations, may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Sidelink resources may be allocated for sidelink transmissions between UEs. Sidelink resource allocation may be grouped into two separate modes. In a first mode (Mode 1), sidelink resources for sidelink transmissions may be dynamically scheduled by a base station. Alternatively, in the first mode, sidelink resources for sidelink transmissions may be semi-statically configured by the base station. In a second mode (Mode 2), sidelink resources for sidelink transmissions may be selected using sensing and reservation. For example, a UE may sense available sidelink resources and reserve an available sidelink resource for an upcoming sidelink transmission.

A first UE (e.g., a sidelink Tx UE) may transmit data to a second UE (e.g., a sidelink Rx UE) on a sidelink resource identified by a sidelink resource allocation. In the first mode and the second mode of resource allocation, the second UE may monitor a plurality of sidelink resources (e.g., subchannels) to receive the data over a PSCCH or PSSCH from the first UE. The request, and the corresponding sidelink resource allocation, may be associated with various parameters which may vary from allocation to allocation. While the content of the request and the scheduling information on the radio access interface (e.g., the Uu interface) is well defined, the content of the request and the scheduling information on the sidelink interface (e.g., the PC5 interface, may not be well defined. Furthermore, different UEs may be associated with different capabilities, and different approaches can be used for sidelink scheduling (e.g., Mode 1 versus Mode 2).

Figure 5:
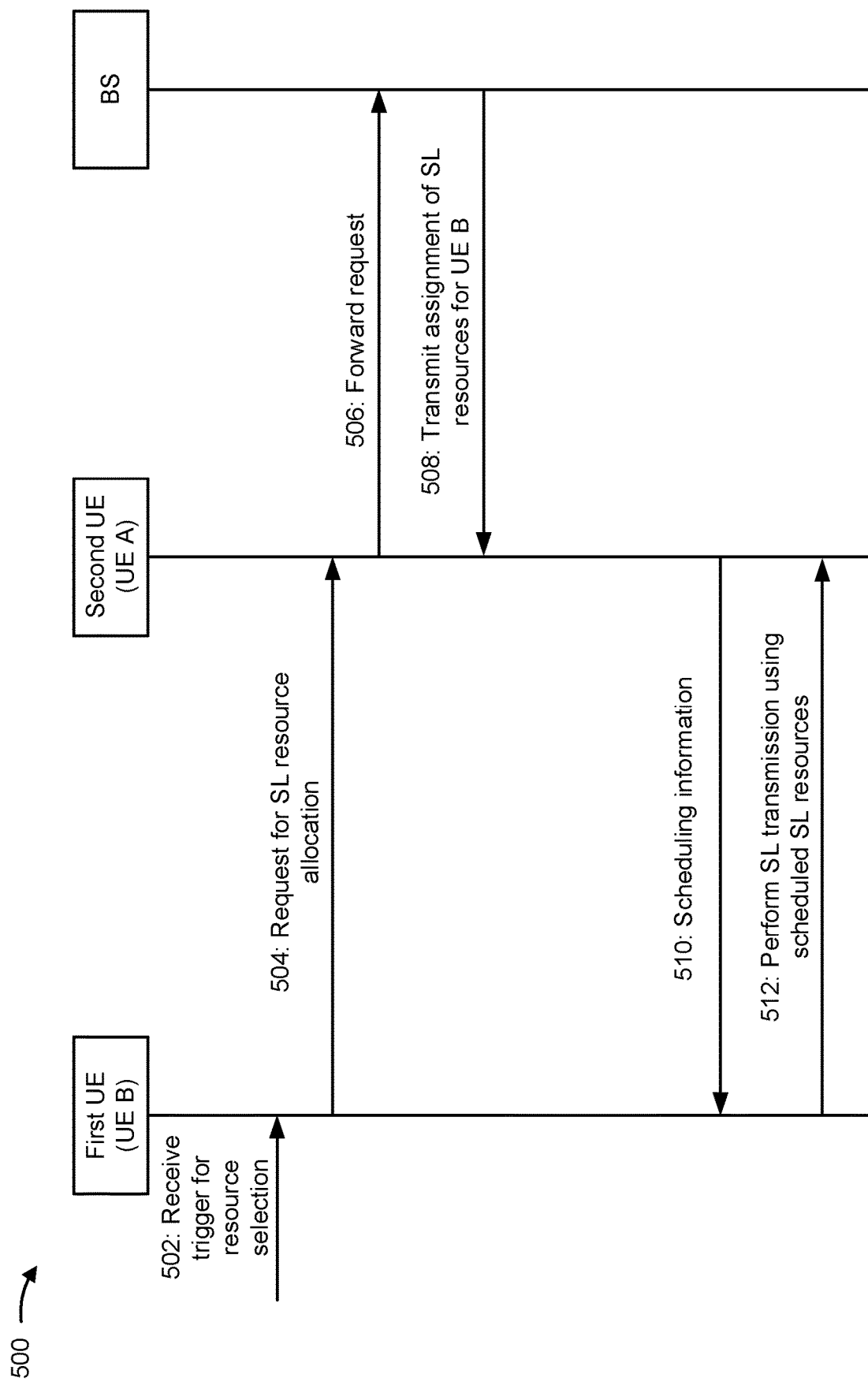
FIG. 5 is a diagram illustrating an example of requesting a sidelink resource allocation and receiving scheduling information based at least in part on the request, in accordance with the present disclosure.

FIG. 5 is a diagram illustrating an example 500 of requesting a sidelink resource allocation and receiving scheduling information based at least in part on the request, in accordance with the present disclosure. FIGS. 6A and 6B are diagrams illustrating examples of a request shown by reference number 504 for a sidelink resource allocation and scheduling information shown by reference number 510 based at least in part on the request, in accordance with the present disclosure.

As shown in FIG. 5, example 500 includes communication between a first UE (e.g., UE 120a), a second UE (e.g., UE 120e), and a base station (e.g., base station 110a). In some aspects, the first UE, the second UE, and the base station 110a may be included in a wireless network such as wireless network 100. The first UE, the second UE, and the base station may communicate on a wireless sidelink. In some aspects, the base station may be associated with a radio access link to one or more of the first UE or the second UE. In some aspects, the base station may be associated with a radio access link to only the second UE. If the base station is associated with a radio access link to only the second UE, the second UE may function as a relay between the base station and the first UE, for example, for the purpose of relaying data communications, scheduling information, and/or the like.

As shown by reference number 502, the first UE (UE B) may receive a trigger for sidelink resource selection. For example, the first UE may receive or generate data to be transmitted using a sidelink resource. In some aspects, the first UE may be a wearable device, such as a head-mounted display, a smart watch, and/or the like.

As shown by reference number 504, the first UE may transmit a request for resource allocation to the second UE (UE A). In other words, the UE may request an allocation of sidelink resources from the second UE. In some aspects, the request may be referred as a scheduling request or a sidelink scheduling request (SL-SR). In some aspects, the second UE may be a relay device, such as a mobile device that acts as a relay for the first UE. In some aspects, the request may be associated with a sidelink resource allocation. For example, the request may indicate that the second UE is to provide information indicating resources associated with a sidelink resource allocation, where the resources associated with the sidelink resource allocation can be preferred resources (that is, resources selected as the sidelink resource allocation or resources from which the first UE can select the sidelink resource allocation) or non-preferred resources (that is, resources that the first UE should avoid when selecting the sidelink resource allocation). In some aspects, the request may be transmitted to a base station performing scheduling. In some aspects, the UE 120 may receive information indicating resources associated with a sidelink resource allocation without having transmitted the request. For example, the information indicating resources associated with the sidelink resource allocation may be transmitted in connection with establishing a unicast link between the first UE and the second UE.

FIG. 6A shows various parameters that can be included in the request shown by reference number 504. In some aspects, the request may include an indicator to request resources. For example, the parameters may include a one-bit indication (not shown in FIG. 6A). Dashed boxes indicate optional parameters in the request shown by reference number 504.

In some aspects, the request may indicate one or more priority levels for one or more transmissions to be performed on the sidelink resource allocation. For example, the request may indicate a set of priority levels (e.g., a single priority level corresponding to one or more transmissions, or multiple priority levels corresponding to multiple transmissions). In some aspects, a priority level may indicate whether a transmission is to be prioritized relative to another transmission. In some aspects, a priority level may indicate a traffic class associated with a transmission (e.g., ultra-reliable low-latency communication, best effort, and/or the like). The sidelink resource allocation may be based at least in part on the one or more priority levels. For example, the sidelink resource allocation may include a set of sidelink resources that can accommodate the one or more transmissions (and/or one or more retransmissions associated with the one or more transmissions) such that the indicated priority level can be facilitated.

In some aspects, the request may indicate one or more packet delay budgets (PDBs) for one or more transmissions to be performed on the sidelink resource allocation. A packet delay budget may indicate a maximum permissible delay associated with a packet of a transmission. In some aspects, the one or more packet delay budgets may correspond to the one or more priority levels. The sidelink resource allocation may be based at least in part on the one or more packet delay budgets. For example, the sidelink resource allocation may be selected so that the one or more packet delay budgets are satisfied for the one or more transmissions to be performed on the sidelink resource allocation.

In some aspects, the request may indicate whether the sidelink resource allocation is to be periodic or aperiodic. For example, the request may indicate whether to provide a periodic resource allocation or an aperiodic resource allocation. In some aspects, the request may indicate whether the sidelink resource allocation is to be periodic or aperiodic for the one or more priority levels indicated by the request. For example, the request may indicate whether a given priority level of the one or more priority levels is to be associated with a periodic or an aperiodic sidelink resource allocation. The sidelink resource allocation may be based at least in part on the indication of whether the sidelink resource allocation is to be periodic or aperiodic. For example, a periodic sidelink resource allocation may be associated with a periodicity and may repeat in accordance with the periodicity, whereas an aperiodic sidelink resource allocation may include a non-repeating resource allocation.

In some aspects, the request may indicate a number of retransmission occasions, such as a number of blind retransmission occasions. A blind retransmission is a retransmission of an initial transmission that is performed without receiving feedback regarding the initial transmission. Based at least in part on indicating a number of blind retransmissions associated with the sidelink resource allocation (e.g., associated with a transmission to be performed on the sidelink resource allocation), the sidelink resource allocation can be configured to accommodate the number of blind retransmissions, for example, by providing resources sufficient to accommodate the number of blind retransmissions. In some aspects, the request may indicate a number of blind retransmission occasions for a given priority level indicated by the request.

In some aspects, the request may indicate whether hybrid automatic repeat request (HARQ) feedback is to be provided for a transmission on the sidelink resource allocation. HARQ feedback is feedback indicating whether the transmission was successfully received. If the HARQ feedback indicates that the transmission is not successfully received, then the first UE may retransmit the transmission. Thus, if the request indicates that HARQ feedback is to be provided, the sidelink resource allocation may be configured to provide sufficient resources for a retransmission of the transmission.

In some aspects, the request may include a buffer status report for the first UE. A buffer status report may indicate how much data is buffered for transmission by the first UE. In some aspects, the request may indicate one or more buffer status reports corresponding to one or more priority levels indicated by the request. For example, the request may include a first buffer status report for a first priority level of traffic, a second buffer status report for a second priority level of traffic, and so on. The sidelink resource allocation may be based at least in part on the buffer status report. For example, a size of the sidelink resource allocation, a modulation and coding scheme (MCS), a number of layers, and/or the like may be configured to accommodate an amount of data indicated by the buffer status report.

In some aspects, the request may include one or more UE identifiers. For example, the request may include a UE identifier that identifies the first UE and/or a UE identifier that identifies the second UE. Providing the UE identifier of the first UE in the request may enable the second UE to determine which UE transmitted the request, whereas providing the UE identifier of the second UE in the request may enable the second UE to determine that the second UE is to schedule the sidelink resource allocation.

In some aspects, the request may identify a carrier on which the sidelink resource allocation is to be selected. For example, in some aspects, the first UE may operate on, or perform sensing or transmission on, a subset of configured carriers. In some examples, the first UE may provide information indicating one or more carriers on which the sidelink resource allocation is to be selected. In some aspects, the request may indicate a carrier on which the scheduling information is to be transmitted. In some aspects, the request may identify a carrier based at least in part on a carrier index associated with the carrier.

In some aspects, the request may identify a resource pool from which the sidelink resource allocation is to be selected. For example, the request may identify a resource pool index associated with the resource pool. In some aspects, the first UE may operate on, or perform sensing on, one or more sidelink resource pools. The first UE may indicate the one or more sidelink resource pools in the request. The second UE may configure the sidelink resource allocation and/or transmit the scheduling information on a resource pool indicated by the request.

In some aspects, the request may indicate a beam index of a beam to be used with regard to the sidelink resource allocation. For example, the request may indicate a beam to be used for a transmission on the sidelink resource allocation. As another example, the request may indicate a beam to be used to transmit the scheduling information to the first UE. The second UE may determine the scheduling information based at least in part on the beam index. For example, the second UE may select a set of sidelink resources that can be used for a transmission on the indicated beam, or may transmit the scheduling information based at least in part on the indicated beam.

Returning to FIG. 5, as shown by reference number 506, the second UE may receive the request associated with the sidelink resource allocation from the first UE. In some aspects, such as in Mode 1, the second UE may forward the request to a base station. As shown by reference number 508, the base station may receive the request from the second UE if the second UE forwards the request to the base station.

The base station or the second UE may assign sidelink resources for the first UE to perform sidelink transmissions. For example, the base station or the second UE may assign the sidelink resources for the first UE based at least in part on the request and/or based at least in part on the information included in the request, as described in more detail in connection with reference number 504 of FIGS. 5 and 6A, above. As another example, the second UE may determine the sidelink resource allocation based at least in part on the request. If the base station assigns the sidelink resources, the base station may transmit, to the second UE, an assignment of sidelink resources for the first UE. In some aspects, the sidelink resources may be preferred resources (that is, resources selected as the sidelink resource allocation or resources from which the first UE can select the sidelink resource allocation) or non-preferred resources (that is, resources that the first UE should avoid when selecting the sidelink resource allocation).

As shown by reference number 510, if the second UE forwards the request to the base station, the second UE may receive, from the base station, the assignment of sidelink resources for the first UE. The second UE may forward or transmit the assignment of sidelink resources to the first UE. In other words, the second UE may transmit scheduling information to the first UE that indicates the assignment of sidelink resources for the first UE (e.g., resources associated with a sidelink resource allocation, which may include preferred resources and/or non-preferred resources). In some aspects, the second UE may transmit the scheduling information to the first UE without having received the request from the first UE.

FIG. 6B shows various parameters that can be included in the scheduling information or transmitted in association with the scheduling information. In some aspects, at least part of the parameters described in connection with FIG. 6B may be explicitly included in the scheduling information. In some aspects, at least part of the parameters described in connection with FIG. 6B may be implicitly included in the scheduling information, for example, based at least in part on a resource on which the scheduling information is transmitted, a format used for the scheduling information, a sequence used for the scheduling information, and/or the like. The sequence may be a pseudo-random sequence, such as a Gold sequence or a Zadoff-Chu sequence. Different initializations of the sequence may be mapped to different sidelink resource configurations, and the mapping may be indicated via radio resource control signaling. Dashed boxes indicate optional parameters that may be included in the scheduling information.

In some aspects, the scheduling information may indicate a resource assignment, such as a time and frequency (time/frequency) resource assignment. For example, the scheduling information may indicate the resource assignment per requested priority level (e.g., per priority level indicated in the request). In some aspects, the scheduling information may indicate a number of resources reserved for a transmission associated with a priority level.

In some aspects, the scheduling information may indicate a periodicity associated with a resource reservation. For example, the scheduling information may indicate a periodicity associated with a transmission, a periodicity associated with the sidelink resource allocation, a periodicity associated with a given priority level indicated by the request, and/or the like.

In some aspects, the scheduling information may indicate a channel busy ratio (CBR). For example, the scheduling information may indicate a CBR index corresponding to a CBR to be used for a given transmission or for a given priority level. In some aspects, the first UE may select a set of resources, of the sidelink resource allocation, based at least in part on the CBR, and may perform a transmission on the selected set of resources. In some aspects, the CBR is determined by UE A based at least in part on a priority level of a packet to be transmitted by UE B. For example, the priority level may be signaled explicitly from UE B, or may be inferred from the scheduling request (SR) resource configuration used. If UE A selects resources for the transmission of UE B, the CBR is used by UE A. If UE A selects a set of resources and transmits information indicating the set of resources to UE B for UE B to select a resource, the CBR may be indicated to UE B, and then UE B may use the CBR to select resources from the set of resources selected by UE A.

In some aspects, the scheduling information may indicate one or more UE identifiers. For example, the scheduling information may indicate a source identifier (e.g., an identifier of the second UE) so that the first UE can identify the source of the scheduling information (e.g., in case the first UE has transmitted multiple requests for sidelink resource allocations). As another example, the scheduling information may indicate a destination identifier (e.g., an identifier of the first UE), which may be helpful if the second UE is transmitting scheduling information for multiple first UEs.

In some aspects, the scheduling information may indicate a suggested maximum modulation and coding scheme (MCS) index or a maximum number of layers for the sidelink resource allocation. For example, the scheduling information may indicate a suggested maximum MCS index or a suggested maximum number of layers for a transmission on the sidelink resource allocation. The second UE may determine this information based at least in part on channel conditions associated with the first UE and/or the second UE, traffic conditions associated with the first UE and/or the second UE, and/or the like.

In some aspects, the scheduling information may indicate one or more beams associated with the sidelink resource allocation. For example, the scheduling information may include one or more beam indexes corresponding to one or more beams to be used for transmission on the sidelink resource allocation. In some aspects, the scheduling information may indicate one or more mappings of the one or more beam indexes to one or more sets of resources of the sidelink resource allocation. In some aspects, the scheduling information may indicate one or more carriers associated with the sidelink resource allocation. For example, the scheduling information may include one or more carrier indexes corresponding to one or more carriers associated with resources of the sidelink resource allocation.

In some aspects, the scheduling information may indicate one or more resource pools associated with the sidelink resource allocation. For example, the scheduling information may include one or more resource pool indexes corresponding to one or more resource pools corresponding to one or more sets of resources of the sidelink resource allocation. In some aspects, the scheduling information may indicate one or more mappings of the one or more resource pools to one or more sets of resources of the sidelink resource allocation.

In some aspects, the scheduling information may indicate whether a retransmission associated with the sidelink resource allocation is a blind retransmission or a feedback-based retransmission. For example, the scheduling information may indicate whether the retransmission is associated with blind retransmission or HARQ feedback based retransmission. In some aspects, the scheduling information may indicate whether retransmissions associated with a given priority level are associated with blind retransmission or feedback-based retransmission.

Returning to FIG. 5, based at least in part on the scheduling information, the first UE may determine particular sidelink resources that have been scheduled or reserved for sidelink transmissions from the first UE. For example, the first UE may select a sidelink resource allocation from preferred resources indicated by the scheduling information.

As another example, the first UE may identify the sidelink resource allocation as the preferred resources indicated by the scheduling information. As still another example, the first UE may avoid selecting non-preferred resources as the sidelink resources that have been scheduled or reserved for sidelink transmissions from the first UE. As shown by reference number 512, the first UE may perform a sidelink transmission with the second UE using a scheduled sidelink resource. In other words, the first UE may perform the sidelink transmission with the second UE based at least in part on the scheduling information received from the second UE. In some aspects, the first UE may select the scheduled sidelink resource from the sidelink resource allocation. In some aspects, the sidelink resource allocation may be the scheduled sidelink resource. For example, the UE may transmit the transmission on the sidelink resource allocation (e.g., an entirety of the sidelink resource allocation).

In one or more examples, the second UE may not act as a relay device, as data may be triggered and terminated at a PC5 interface. The second UE may be a source of data and/or a destination for data, such as when the first UE and/or the second UE are included in an IoT network.

As indicated above, FIGS. 5-6B are provided as examples. Other examples may differ from what is described with respect to FIGS. 5-6B.

Figure 7:
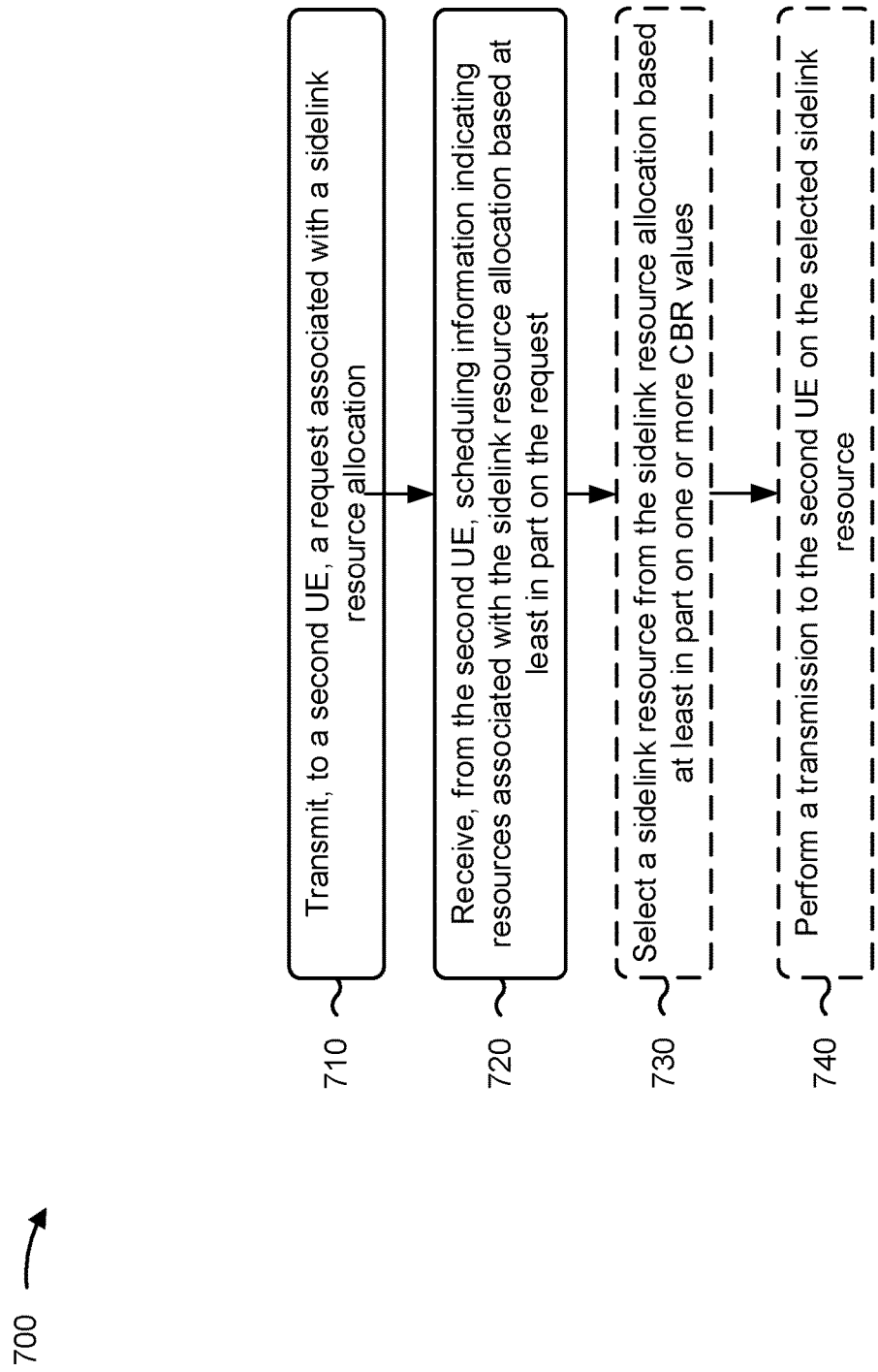
FIGS. 7-8 are diagrams illustrating example processes associated with signaling an indication of a sidelink transmission, in accordance with the present disclosure.

FIG. 7 is a diagram illustrating an example process 700 performed, for example, by a first UE, in accordance with the present disclosure. Example process 700 is an example where the UE (e.g., UE 120, UE 305, UE 405, the first UE (UE B) of FIG. 5, and/or the like) performs operations associated with requesting and reporting information for a scheduler UE (e.g., the second UE (UE A) of FIG. 5).

As shown in FIG. 7, in some aspects, process 700 may include transmitting, to a second UE, a request associated with a sidelink resource allocation (block 710). For example, the first UE (e.g., using antenna 252, transmit processor 264, TX MIMO processor 266, modulator 254, controller/processor 280, and/or memory 282) may transmit, to a second UE, a request associated with a sidelink resource allocation, as described above. The request may include a first set of parameters.

As further shown in FIG. 7, in some aspects, process 700 may include receiving, from the second UE, scheduling information indicating resources associated with the sidelink resource allocation based at least in part on the request (block 720). For example, the first UE (e.g., using antenna 252, demodulator 254, MIMO detector 256, receive processor 258, controller/processor 280, and/or memory 282) may receive, from the second UE, scheduling information indicating resources associated with the sidelink resource allocation based at least in part on the request, as described above. The scheduling information may be based at least in part on the first set of parameters, and may include a second set of parameters.

As further shown in FIG. 7, in some aspects, process 700 may include selecting a sidelink resource from the sidelink resource allocation based at least in part on one or more CBR values (block 730). For example, the UE (e.g., using antenna 252, demodulator 254, MIMO detector 256, receive processor 258, controller/processor 280, and/or memory 282) may select a sidelink resource from the sidelink resource allocation based at least in part on one or more CBR values, as described above. In some aspects, the UE may provide means for selecting a sidelink resource from the sidelink resource allocation based at least in part on one or more CBR values.

As further shown in FIG. 7, in some aspects, process 700 may include performing a transmission to the second UE on the selected sidelink resource (block 740). For example, the UE (e.g., using antenna 252, demodulator 254, MIMO detector 256, receive processor 258, controller/processor 280, and/or memory 282) may perform a transmission to the second UE on the selected sidelink resource, as described above. In some aspects, the UE may provide means for performing a transmission to the second UE on the selected sidelink resource.

Process 700 may include additional aspects, such as any single aspect or any combination of aspects described below and/or in connection with one or more other processes described elsewhere herein.

In a first aspect, the request comprises a one-bit indication.

In a second aspect, alone or in combination with the first aspect, the first set of parameters indicates one or more priority levels for one or more transmissions to be performed on the sidelink resource allocation.

In a third aspect, alone or in combination with one or more of the first and second aspects, the request first set of parameters one or more packet delay budgets for one or more transmissions to be performed on the sidelink resource allocation.

In a fourth aspect, alone or in combination with one or more of the first through third aspects, the one or more packet delay budgets correspond to one or more priority levels indicated by the request.

In a fifth aspect, alone or in combination with one or more of the first through fourth aspects, the first set of parameters indicates whether the sidelink resource allocation is to be periodic or aperiodic.

In a sixth aspect, alone or in combination with one or more of the first through fifth aspects, the first set of parameters indicates whether the sidelink resource allocation is to be periodic or aperiodic for one or more priority levels indicated by the request.

In a seventh aspect, alone or in combination with one or more of the first through sixth aspects, the first set of parameters indicates a number of retransmission occasions associated with the sidelink resource allocation.

In an eighth aspect, alone or in combination with one or more of the first through seventh aspects, the first set of parameters indicates whether hybrid automatic repeat request feedback is to be provided for a transmission on the sidelink resource allocation.

In a ninth aspect, alone or in combination with one or more of the first through eighth aspects, the request includes a buffer status report for the first UE.

In a tenth aspect, alone or in combination with one or more of the first through ninth aspects, the buffer status report corresponds to one or more priority levels indicated by the request.

In an eleventh aspect, alone or in combination with one or more of the first through tenth aspects, the first set of parameters indicates an identifier of the first UE.

In a twelfth aspect, alone or in combination with one or more of the first through eleventh aspects, the first set of parameters identifies an identifier of the second UE.

In a thirteenth aspect, alone or in combination with one or more of the first through twelfth aspects, the first set of parameters identifies a carrier on which the sidelink resource allocation is to be selected.

In a fourteenth aspect, alone or in combination with one or more of the first through thirteenth aspects, the first set of parameters identifies a resource pool from which the sidelink resource allocation is to be selected.

In a fifteenth aspect, alone or in combination with one or more of the first through fourteenth aspects, the first set of parameters identifies a beam index of a beam to be used with regard to the sidelink resource allocation.

In a sixteenth aspect, alone or in combination with one or more of the first through fifteenth aspects, the second set of parameters indicates one or more time and frequency resource allocations of the sidelink resource allocation.

In a seventeenth aspect, alone or in combination with one or more of the first through sixteenth aspects, the one or more time and frequency resource allocations correspond to one or more priority levels.

In an eighteenth aspect, alone or in combination with one or more of the first through seventeenth aspects, the second set of parameters indicates one or more numbers of resources that are reserved for the one or more time and frequency resource allocations.

In a nineteenth aspect, alone or in combination with one or more of the first through eighteenth aspects, the second set of parameters indicates one or more periodicities for the sidelink resource allocation.

In a twentieth aspect, alone or in combination with one or more of the first through nineteenth aspects, the one or more periodicities correspond to one or more priority levels.

In a twenty-first aspect, alone or in combination with one or more of the first through twentieth aspects, the second set of parameters indicates one or more CBR values associated with the sidelink resource allocation.

In a twenty-second aspect, alone or in combination with one or more of the first through twenty-first aspects, process 700 includes selecting a sidelink resource from the sidelink resource allocation based at least in part on the one or more CBR values.

In a twenty-third aspect, alone or in combination with one or more of the first through twenty-second aspects, the one or more CBR values correspond to one or more priority levels.

In a twenty-fourth aspect, alone or in combination with one or more of the first through twenty-third aspects, the second set of parameters indicates an identifier of the first UE.

In a twenty-fifth aspect, alone or in combination with one or more of the first through twenty-fourth aspects, the second set of parameters indicates an identifier of the second UE.

In a twenty-sixth aspect, alone or in combination with one or more of the first through twenty-fifth aspects, the second set of parameters indicates a suggested maximum modulation and coding scheme or a maximum number of layers for the sidelink resource allocation.

In a twenty-seventh aspect, alone or in combination with one or more of the first through twenty-sixth aspects, the scheduling information indicates one or more beam indexes of one or more beams to be used for the sidelink resource allocation.

In a twenty-eighth aspect, alone or in combination with one or more of the first through twenty-seventh aspects, the second set of parameters identifies one or more carriers associated with the sidelink resource allocation.

In a twenty-ninth aspect, alone or in combination with one or more of the first through twenty-eighth aspects, the second set of parameters identifies a resource pool associated with the sidelink resource allocation.

In a thirtieth aspect, alone or in combination with one or more of the first through twenty-ninth aspects, the second set of parameters indicates whether a retransmission associated with the sidelink resource allocation is a blind retransmission or a feedback-based retransmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
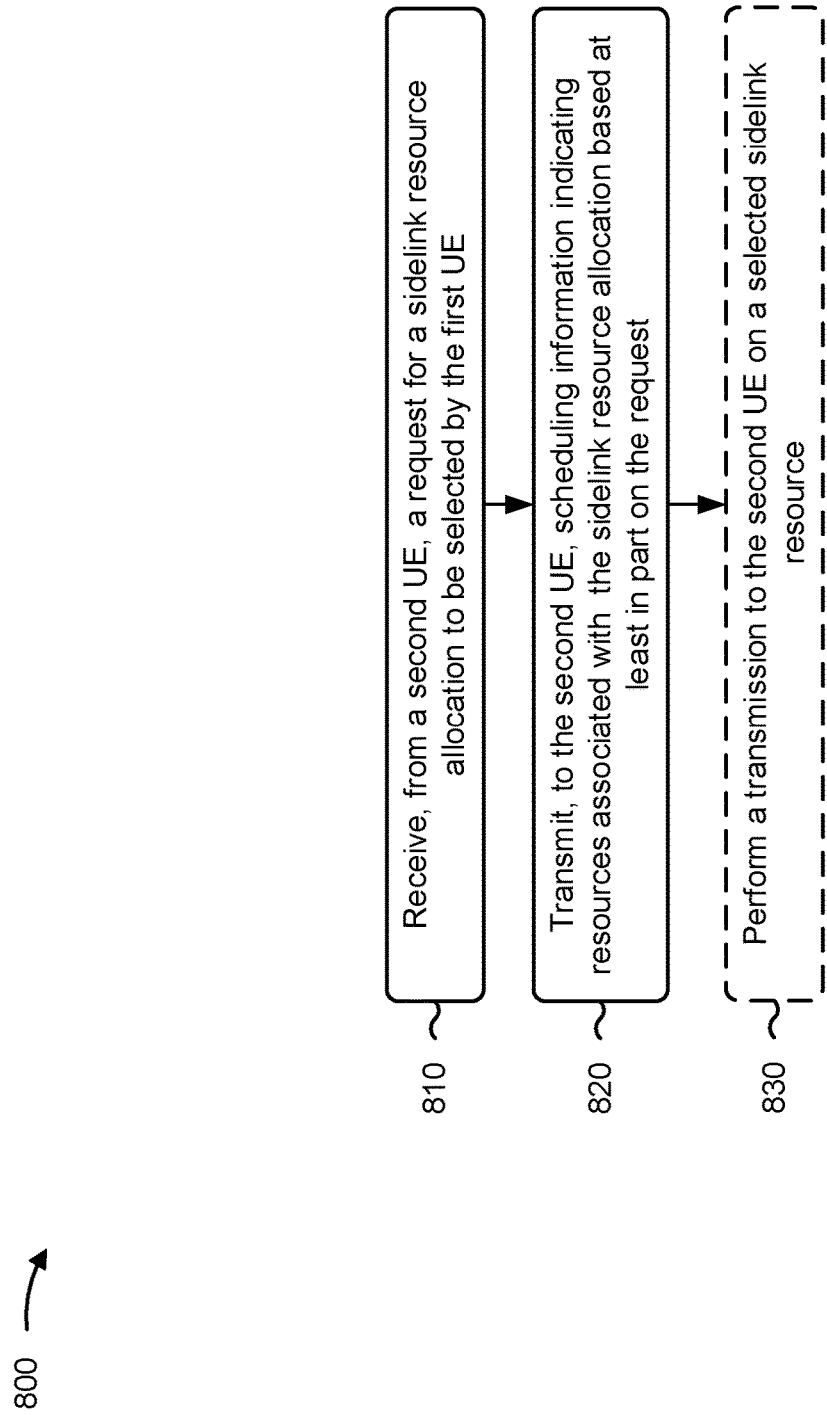

FIG. 8 is a diagram illustrating an example process 800 performed, for example, by an UE, in accordance with the present disclosure. Example process 800 is an example where the UE (e.g., UE 120, UE 305, UE 405, the second UE (UE A) of FIG. 5, and/or the like)) performs operations associated with requesting and reporting information for a scheduler UE (e.g., the second UE (UE A) of FIG. 5).

As shown in FIG. 8, in some aspects, process 800 may include receiving, from a second UE, a request associated with a sidelink resource allocation to be selected by the first UE (block 810). For example, the first UE (e.g., using antenna 252, demodulator 254, MIMO detector 256, receive processor 258, controller/processor 280, and/or memory 282) may receive, from a second UE, a request associated with a sidelink resource allocation to be selected by the first UE, as described above.

As further shown in FIG. 8, in some aspects, process 800 may include transmitting, to the second UE, scheduling information indicating resources associated with the sidelink resource allocation based at least in part on the request (block 820). For example, the UE (e.g., using antenna 252, transmit processor 264, TX MIMO processor 266, modulator 254, controller/processor 280, and/or memory 282) may transmit, to the second UE, scheduling information indicating resources associated with the sidelink resource allocation based at least in part on the request, as described above.

As further shown in FIG. 8, in some aspects, process 800 may optionally include performing a transmission to the second UE on a selected sidelink resource (block 830). For example, the UE (e.g., using antenna 252, transmit processor 264, TX MIMO processor 266, modulator 254, controller/processor 280, and/or memory 282) may perform a transmission to the second UE, as described above. In some aspects, the selected sidelink resource may be associated with the resources associated with the sidelink resource allocation. For example, the selected sidelink resource may include preferred resources of the sidelink resource allocation. As another example, the selected sidelink resource may exclude non-preferred resources of the sidelink resource allocation.

Process 800 may include additional aspects, such as any single aspect or any combination of aspects described below and/or in connection with one or more other processes described elsewhere herein.

In a first aspect, the request comprises a one-bit indication.

In a second aspect, alone or in combination with the first aspect, the first set of parameters indicates one or more priority levels for one or more transmissions to be performed on the sidelink resource allocation.

In a third aspect, alone or in combination with one or more of the first and second aspects, the first set of parameters indicates one or more packet delay budgets for one or more transmissions to be performed on the sidelink resource allocation.

In a fourth aspect, alone or in combination with one or more of the first through third aspects, the one or more packet delay budgets correspond to one or more priority levels indicated by the request.

In a fifth aspect, alone or in combination with one or more of the first through fourth aspects, the first set of parameters indicates whether the sidelink resource allocation is to be periodic or aperiodic.

In a sixth aspect, alone or in combination with one or more of the first through fifth aspects, the first set of parameters indicates whether the sidelink resource allocation is to be periodic or aperiodic for one or more priority levels indicated by the request.

In a seventh aspect, alone or in combination with one or more of the first through sixth aspects, the first set of parameters indicates a number of retransmission occasions associated with the sidelink resource allocation.

In an eighth aspect, alone or in combination with one or more of the first through seventh aspects, the first set of parameters indicates whether hybrid automatic repeat request feedback is to be provided for a transmission on the sidelink resource allocation.

In a ninth aspect, alone or in combination with one or more of the first through eighth aspects, the first set of parameters includes a buffer status report for the second UE.

In a tenth aspect, alone or in combination with one or more of the first through ninth aspects, the buffer status report corresponds to one or more priority levels indicated by the request.

In an eleventh aspect, alone or in combination with one or more of the first through tenth aspects, the first set of parameters indicates an identifier of the first UE.

In a twelfth aspect, alone or in combination with one or more of the first through eleventh aspects, the first set of parameters identifies an identifier of the second UE.

In a thirteenth aspect, alone or in combination with one or more of the first through twelfth aspects, the first set of parameters identifies a carrier on which the sidelink resource allocation is to be selected.

In a fourteenth aspect, alone or in combination with one or more of the first through thirteenth aspects, the first set of parameters identifies a resource pool from which the sidelink resource allocation is to be selected.

In a fifteenth aspect, alone or in combination with one or more of the first through fourteenth aspects, the first set of parameters identifies a beam index of a beam to be used with regard to the sidelink resource allocation.

In a sixteenth aspect, alone or in combination with one or more of the first through fifteenth aspects, the second set of parameters indicates one or more time and frequency resource allocations of the sidelink resource allocation.

In a seventeenth aspect, alone or in combination with one or more of the first through sixteenth aspects, the one or more time and frequency resource allocations correspond to one or more priority levels.

In an eighteenth aspect, alone or in combination with one or more of the first through seventeenth aspects, the second set of parameters indicates one or more numbers of resources that are reserved for the one or more time and frequency resource allocations.

In a nineteenth aspect, alone or in combination with one or more of the first through eighteenth aspects, the second set of parameters indicates one or more periodicities for the sidelink resource allocation.

In a twentieth aspect, alone or in combination with one or more of the first through nineteenth aspects, the one or more periodicities correspond to one or more priority levels.

In a twenty-first aspect, alone or in combination with one or more of the first through twentieth aspects, the second set of parameters indicates one or more CBR values associated with the sidelink resource allocation.

In a twenty-second aspect, alone or in combination with one or more of the first through twenty-first aspects, the one or more CBR values correspond to one or more priority levels.

In a twenty-third aspect, alone or in combination with one or more of the first through twenty-second aspects, the second set of parameters indicates an identifier of the first UE.

In a twenty-fourth aspect, alone or in combination with one or more of the first through twenty-third aspects, the second set of parameters indicates an identifier of the second UE.

In a twenty-fifth aspect, alone or in combination with one or more of the first through twenty-fourth aspects, the second set of parameters indicates a suggested maximum modulation and coding scheme or a maximum number of layers for the sidelink resource allocation.

In a twenty-sixth aspect, alone or in combination with one or more of the first through twenty-fifth aspects, the second set of parameters indicates one or more beam indexes of one or more beams to be used for the sidelink resource allocation.

In a twenty-seventh aspect, alone or in combination with one or more of the first through twenty-sixth aspects, the second set of parameters identifies one or more carriers associated with the sidelink resource allocation.

In a twenty-eighth aspect, alone or in combination with one or more of the first through twenty-seventh aspects, the second set of parameters identifies a resource pool associated with the sidelink resource allocation.

In a twenty-ninth aspect, alone or in combination with one or more of the first through twenty-eighth aspects, the scheduling information indicates whether a retransmission associated with the sidelink resource allocation is a blind retransmission or a feedback-based retransmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
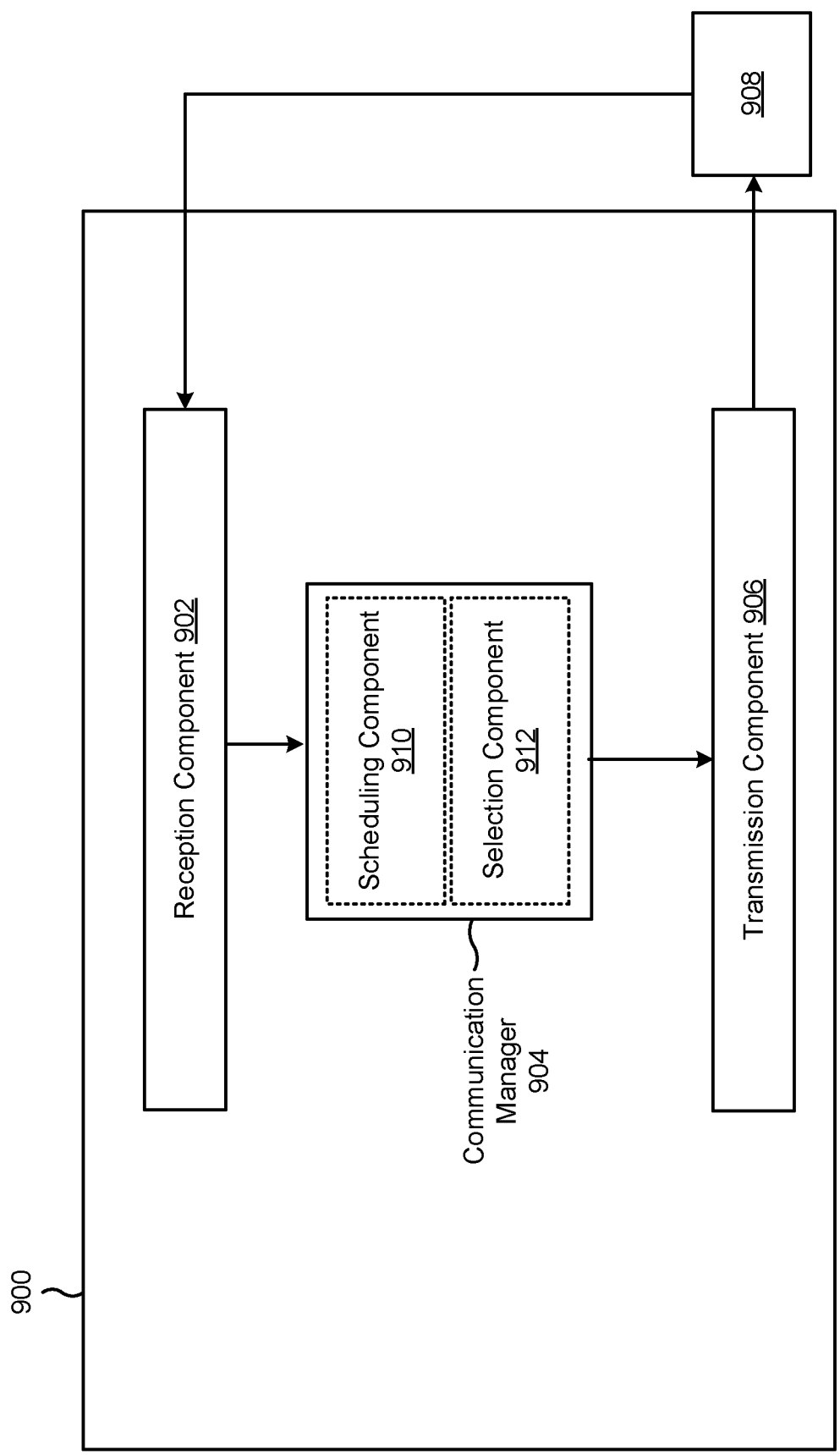
FIG. 9 is a block diagram of an example apparatus for wireless communication, in accordance with the present disclosure.

FIG. 9 is a block diagram of an example apparatus 900 for wireless communication in accordance with the present disclosure. The apparatus 900 may be a UE, or a UE may include the apparatus 900. In some aspects, the apparatus 900 corresponds to the first UE (e.g., UE B) of FIG. 5. In some aspects, the apparatus 900 corresponds to the second UE (e.g., UE A) of FIG. 5. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 3-6. Additionally or alternatively, the apparatus 900 may be configured to perform one or more processes described herein, such as process 700 of FIG. 7, process 800 of FIG. 8, or a combination thereof. In some aspects, the apparatus 900 may include one or more components of the UE described above in connection with FIG. 2.

The reception component 902 may provide means for receiving communications, such as reference signals, control information, data communications, or a combination thereof, from the apparatus 908. The reception component 902 may provide received communications to one or more other components of the apparatus 900, such as the communication manager 904. In some aspects, the reception component 902 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the first UE described above in connection with FIG. 2.

The transmission component 906 may provide means for transmitting communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may provide means for performing signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the first UE described above in connection with FIG. 2. In some aspects, the transmission component 906 may be co-located with the reception component 902 in a transceiver.

In some aspects, the communication manager 904 may transmit, to a UE, a request associated with a sidelink resource allocation to be selected by the UE; and receive, from the UE, scheduling information indicating resources associated with the sidelink resource allocation based at least in part on the request. In some aspects, the communication manager 904 may receive, from a UE, a request associated with a sidelink resource allocation to be selected by the apparatus 900; and transmit, to the UE, scheduling information indicating resources associated with the sidelink resource allocation based at least in part on the request. In some aspects, the communication manager 904 may include a controller/processor, a memory, a scheduler, a communication unit, or a combination thereof, of the first UE described above in connection with FIG. 2.

In some aspects, the communication manager 904 may include a set of components, such as a scheduling component 910, a selection component 912, or a combination thereof. Alternatively, the set of components may be separate and distinct from the communication manager 904.

In some aspects, the communication manager 904 and/or one or more components of the set of components may include or may be implemented within hardware (e.g., one or more of the circuitry described in connection with FIG. 11). In some aspects, the communication manager 904 and/or one or more components of the set of components may include or may be implemented within a controller/processor, a memory, a scheduler, a communication unit, or a combination thereof, of the UE described above in connection with FIG. 2.

In some aspects, the communication manager 904 and/or one or more components of the set of components be implemented in code (e.g., as software or firmware stored in a memory), such as the code described in connection with FIG. 11. For example, the communication manager 904 and/or a component (or a portion of a component) may be implemented as instructions or code stored in a non-transitory computer-readable medium and executable by a controller or a processor to perform the functions or operations of the communication manager 904 and/or the component. If implemented in code, the functions of the communication manager 904 and/or a component may be executed by a controller/processor, a memory, a scheduler, a communication unit, or a combination thereof, of the UE described above in connection with FIG. 2.

In some aspects, the reception component 902 may receive, from a second UE, a request associated with a sidelink resource allocation to be selected by the apparatus 900. The transmission component 906 may transmit, to the second UE, scheduling information indicating resources associated with the sidelink resource allocation based at least in part on the request. The scheduling component 910 may schedule the sidelink resource allocation.

In some aspects, the transmission component 906 may transmit, to a UE, a request associated with a sidelink resource allocation to be selected by the UE. The reception component 902 may receive, from the UE, scheduling information indicating resources associated with the sidelink resource allocation based at least in part on the request. The selection component 912 may select a sidelink resource from the sidelink resource allocation based at least in part on one or more CBR values. The transmission component 906 may perform a transmission on the selected sidelink resource.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
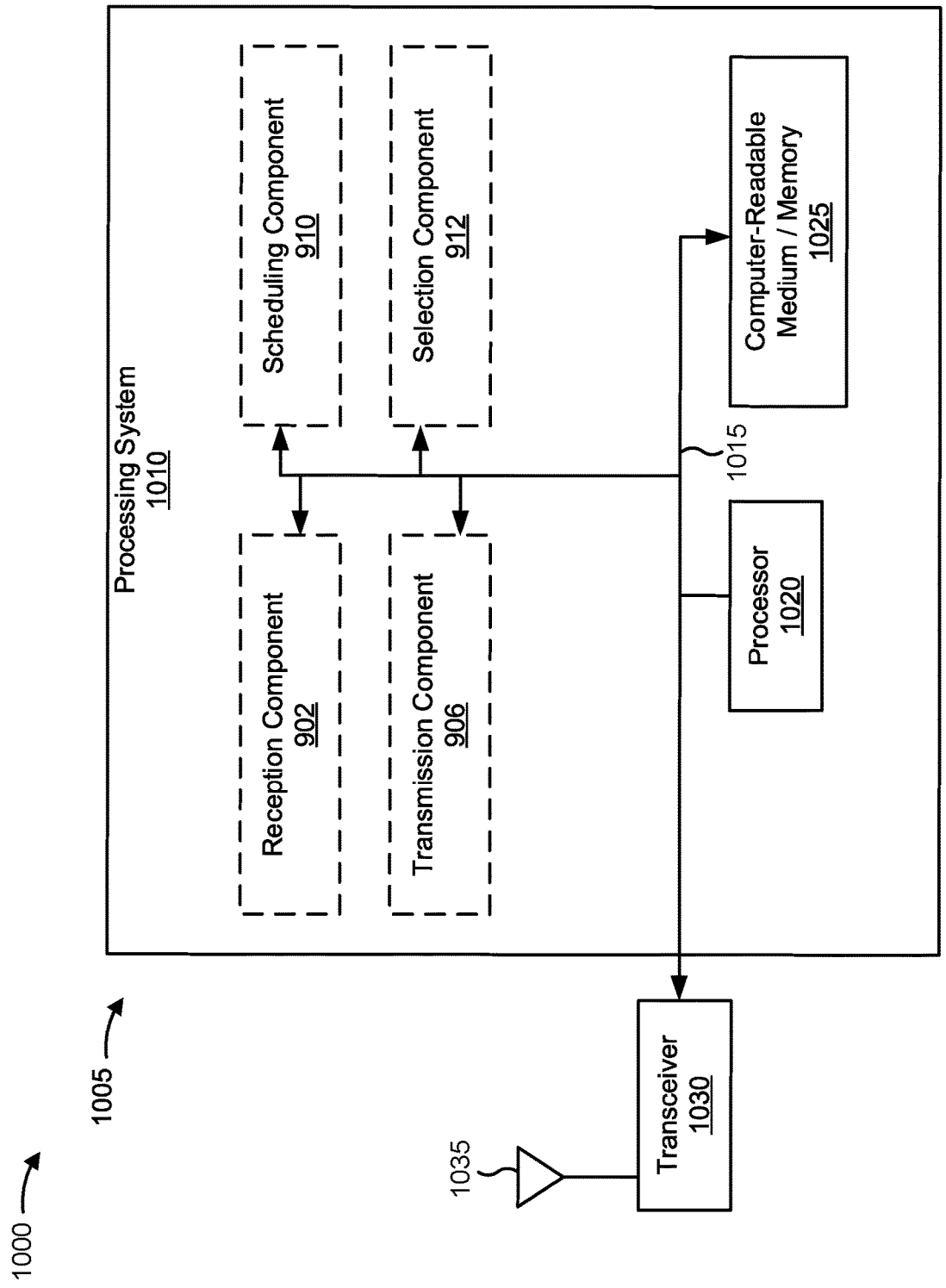
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a UE (e.g., the first UE or the second UE of FIG. 5).

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 906, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication provides means for transmitting, to a second UE, a request associated with a sidelink resource allocation; means for receiving, from the second UE, scheduling information indicating resources associated with the sidelink resource allocation based at least in part on the request means for receiving, from a second UE, a request associated with a sidelink resource allocation to be selected by the first UE; means for transmitting, to the second UE, scheduling information indicating resources associated with the sidelink resource allocation based at least in part on the request. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
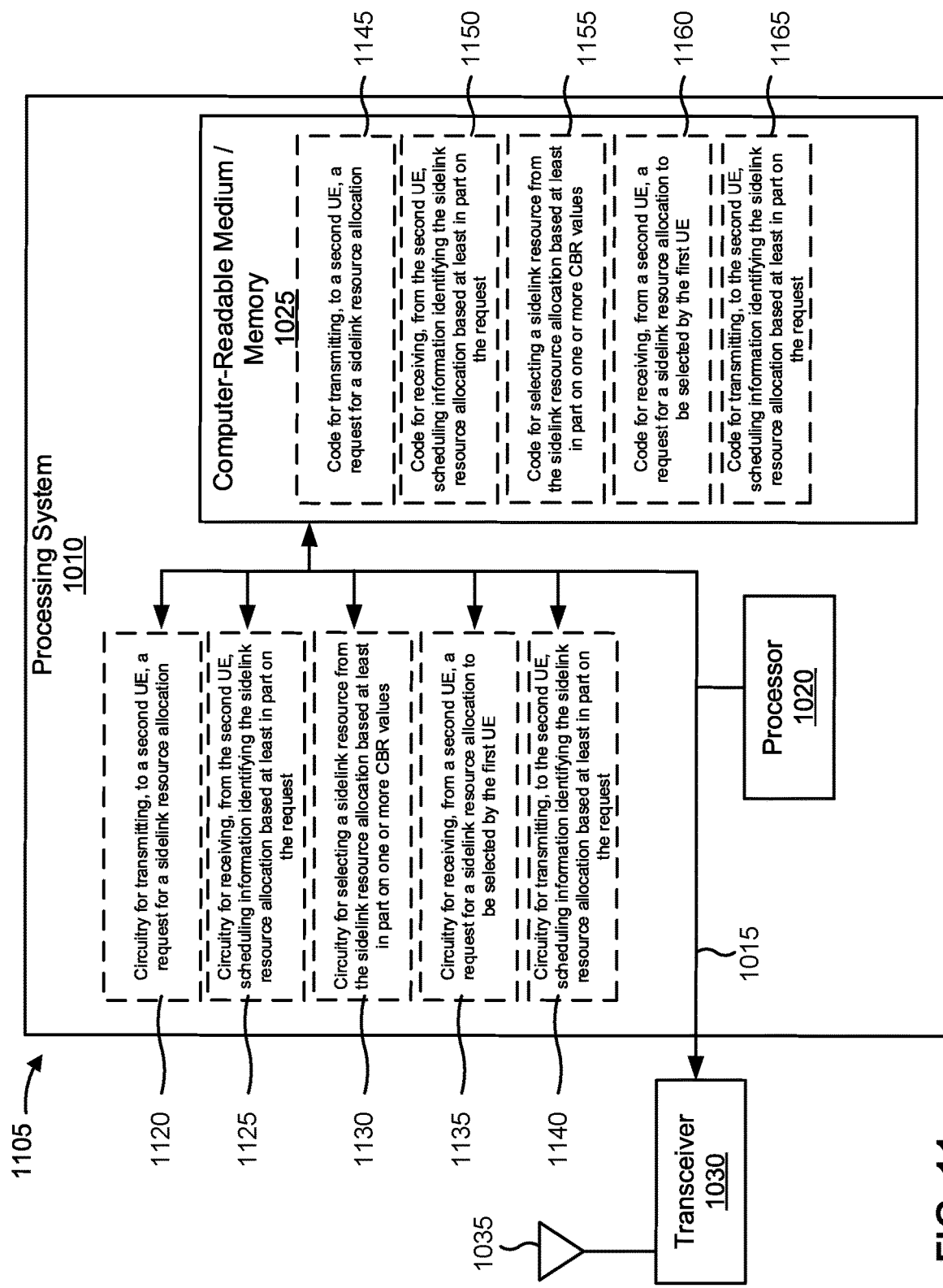
FIG. 11 is a diagram illustrating an example of an implementation of code and circuitry for an apparatus, in accordance with the present disclosure.

FIG. 11 is a diagram illustrating an example 1100 of an implementation of code and circuitry for an apparatus 1105. The apparatus 1105 may be a UE (e.g., a first UE).

As further shown in FIG. 11, the apparatus may include circuitry for transmitting, to a second UE, a request associated with a sidelink resource allocation (circuitry 1120). For example, the apparatus may include circuitry to enable the apparatus to transmit, to a second UE, a request associated with a sidelink resource allocation.

As further shown in FIG. 11, the apparatus may include circuitry for receiving, from the second UE, scheduling information indicating resources associated with the sidelink resource allocation based at least in part on the request (circuitry 1125). For example, the apparatus may include circuitry to enable the apparatus to receive, from the second UE, scheduling information indicating resources associated with the sidelink resource allocation based at least in part on the request.

As further shown in FIG. 11, the apparatus may include circuitry for selecting a sidelink resource from the sidelink resource allocation based at least in part on one or more CBR values (circuitry 1130). For example, the apparatus may include circuitry to enable the apparatus to select a sidelink resource from the sidelink resource allocation based at least in part on one or more CBR values.

As further shown in FIG. 11, the apparatus may include circuitry for receiving, from a second UE, a request associated with a sidelink resource allocation to be selected by the first UE (circuitry 1135). For example, the apparatus may include circuitry to enable the apparatus to receive, from a second UE, a request associated with a sidelink resource allocation to be selected by the first UE.

As further shown in FIG. 11, the apparatus may include circuitry for transmitting, to the second UE, scheduling information indicating resources associated with the sidelink resource allocation based at least in part on the request (circuitry 1140). For example, the apparatus may include circuitry to enable the apparatus to transmit, to the second UE, scheduling information indicating resources associated with the sidelink resource allocation based at least in part on the request.

As further shown in FIG. 11, the apparatus may include, stored in computer-readable medium/memory 1025, code for transmitting, to a second UE, a request associated with a sidelink resource allocation (code 1145). For example, the apparatus may include code that, when executed by the processor 1020, may cause the transceiver 1030 to transmit, to a second UE, a request associated with a sidelink resource allocation.

As further shown in FIG. 11, the apparatus may include, stored in computer-readable medium/memory 1025, code for receiving, from the second UE, scheduling information indicating resources associated with the sidelink resource allocation based at least in part on the request (code 1150). For example, the apparatus may include code that, when executed by the processor 1020, may cause the transceiver 1030 to receive, from the second UE, scheduling information indicating resources associated with the sidelink resource allocation based at least in part on the request.

As further shown in FIG. 11, the apparatus may include, stored in computer-readable medium/memory 1025, code for selecting a sidelink resource from the sidelink resource allocation based at least in part on one or more CBR values (code 1155). For example, the apparatus may include code that, when executed by the processor 1020, may cause the processor 1020 to select a sidelink resource from the sidelink resource allocation based at least in part on one or more CBR values.

As further shown in FIG. 11, the apparatus may include, stored in computer-readable medium/memory 1025, code for receiving, from a second UE, a request associated with a sidelink resource allocation to be selected by the first UE (code 1160). For example, the apparatus may include code that, when executed by the processor 1020, may cause the processor 1020 to receive, from a second UE, a request associated with a sidelink resource allocation to be selected by the first UE.

As further shown in FIG. 11, the apparatus may include, stored in computer-readable medium/memory 1025, code for transmitting, to the second UE, scheduling information indicating resources associated with the sidelink resource allocation based at least in part on the request (code 1165). For example, the apparatus may include code that, when executed by the processor 1020, may cause the processor 1020 to transmit, to the second UE, scheduling information indicating resources associated with the sidelink resource allocation based at least in part on the request.

FIG. 11 is provided as an example. Other examples may differ from what is described in connection with FIG. 11.

Figure 12:
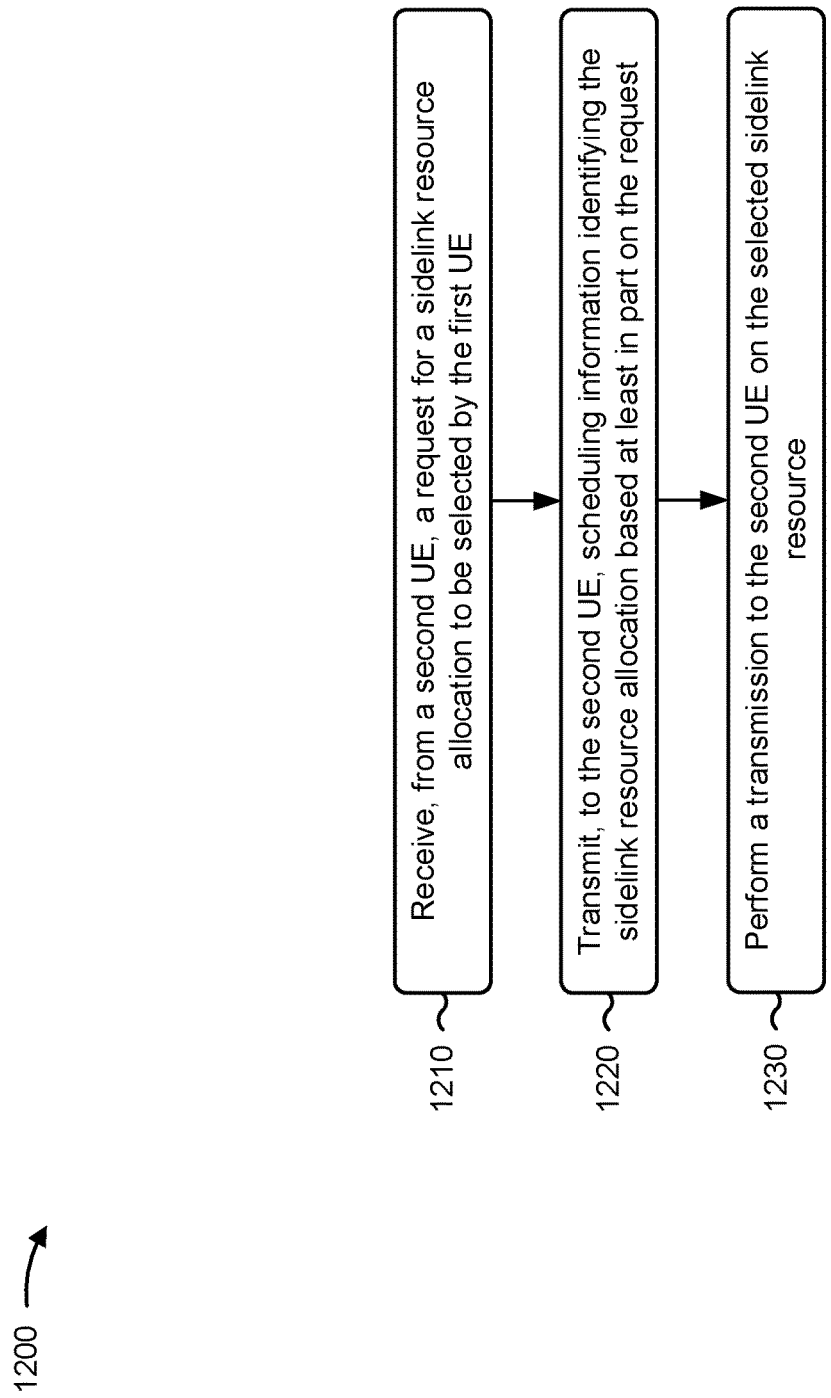
FIG. 12 is a diagram illustrating an example process associated with signaling an indication of a sidelink transmission, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with sidelink communication.

As shown in FIG. 12, in some aspects, process 1200 may include receiving, from a first UE, a request associated with a sidelink resource allocation for a second UE (block 1210). For example, the base station (e.g., using antenna 234, demodulator 232, MIMO detector 236, receive processor 238, controller/processor 240, and/or memory 242) may receive, from a first UE, a request associated with a sidelink resource allocation for a second UE, as described above. In some aspects, the request may be forwarded from the second UE by the first UE. In some aspects, the request may include at least part of the information described in connection with reference number 504, above.

As further shown in FIG. 12, in some aspects, process 1200 may include assigning the sidelink resource allocation for the second UE (block 1220). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may assign the sidelink resource allocation for the second UE, as described above.

As further shown in FIG. 12, in some aspects, process 1200 may include transmitting scheduling information indicating the sidelink resource allocation to the first UE (block 1230). For example, the base station (e.g., using transmit processor 220, TX MIMO processor 230, modulator 232, antenna 234, controller/processor 240, memory 242, and/or scheduler 246) may transmit scheduling information indicating the sidelink resource allocation to the first UE, as described above. In some aspects, the first UE may relay the scheduling information to the second UE. The scheduling information may include at least part of the information described with regard to reference number 510, above.

Process 1200 may include additional aspects, such as any single aspect or any combination of aspects described below and/or in connection with one or more other processes described elsewhere herein.

In a first aspect, the request is from the second UE via the first UE.

In a second aspect, alone or in combination with the first aspect, process 1200 includes configuring the first UE to forward the scheduling information to the second UE.

In a third aspect, alone or in combination with one or more of the first and second aspects, the request is received based at least in part on a configured or semi-persistent resource.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
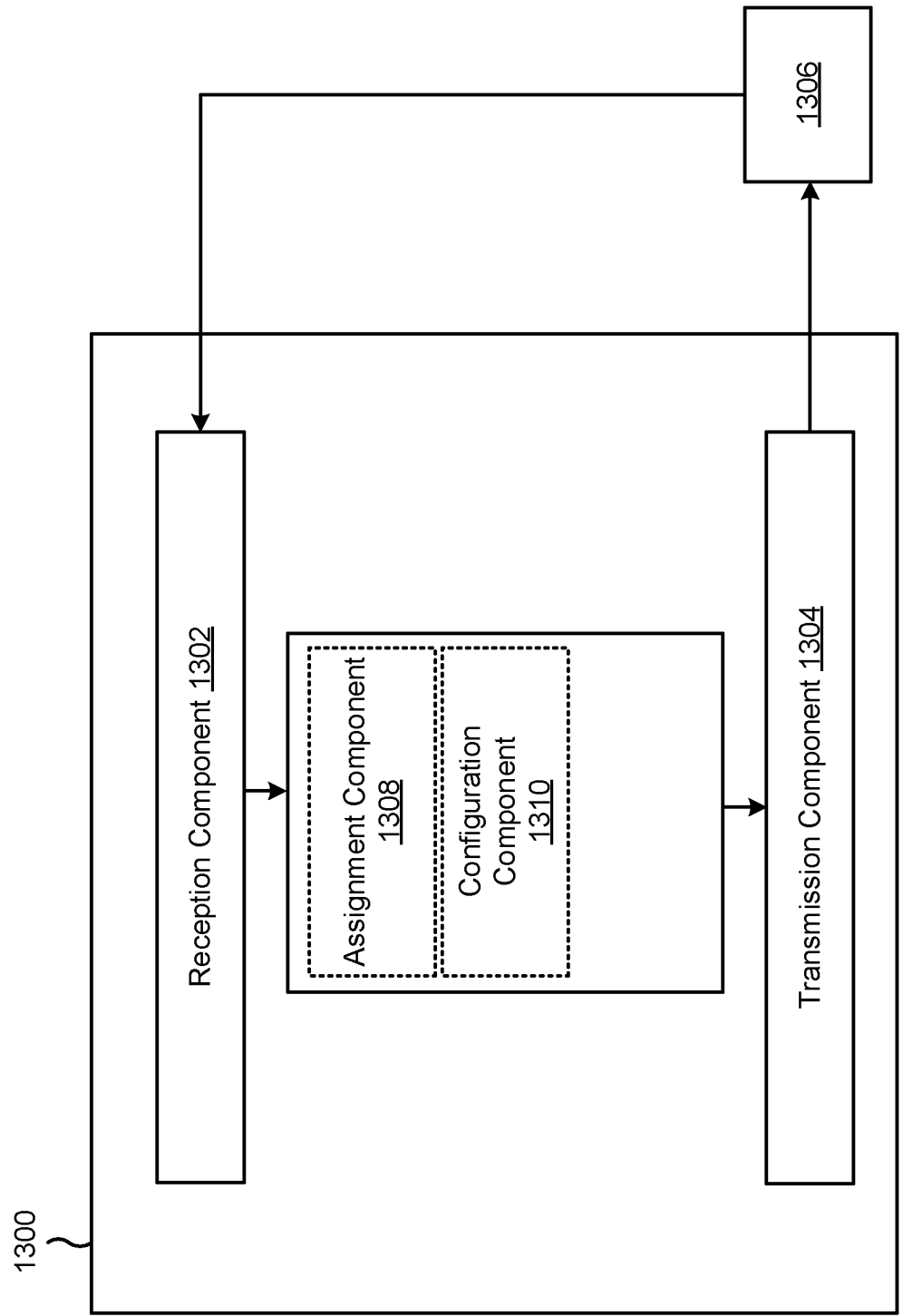
FIG. 13 is a block diagram of an example apparatus for wireless communication, in accordance with the present disclosure.

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include an assignment component 1308 and/or a configuration component 1310, among other examples.

In some aspects, the apparatus 1300 may be configured to perform one or more operations described herein in connection with FIGS. 3-6. Additionally or alternatively, the apparatus 1300 may be configured to perform one or more processes described herein, such as process 1200 of FIG. 12. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The reception component 1302 may receive, from a first UE, a request associated with a sidelink resource allocation for a second UE. The assignment component 1308 may assign the sidelink resource allocation for the second UE. In some aspects, the assignment component 1308 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The transmission component 1304 may transmit scheduling information indicating the sidelink resource allocation to the first UE.

The configuration component 1310 may configure the first UE to forward the scheduling information to the second UE. In some aspects, the configuration component 1310 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
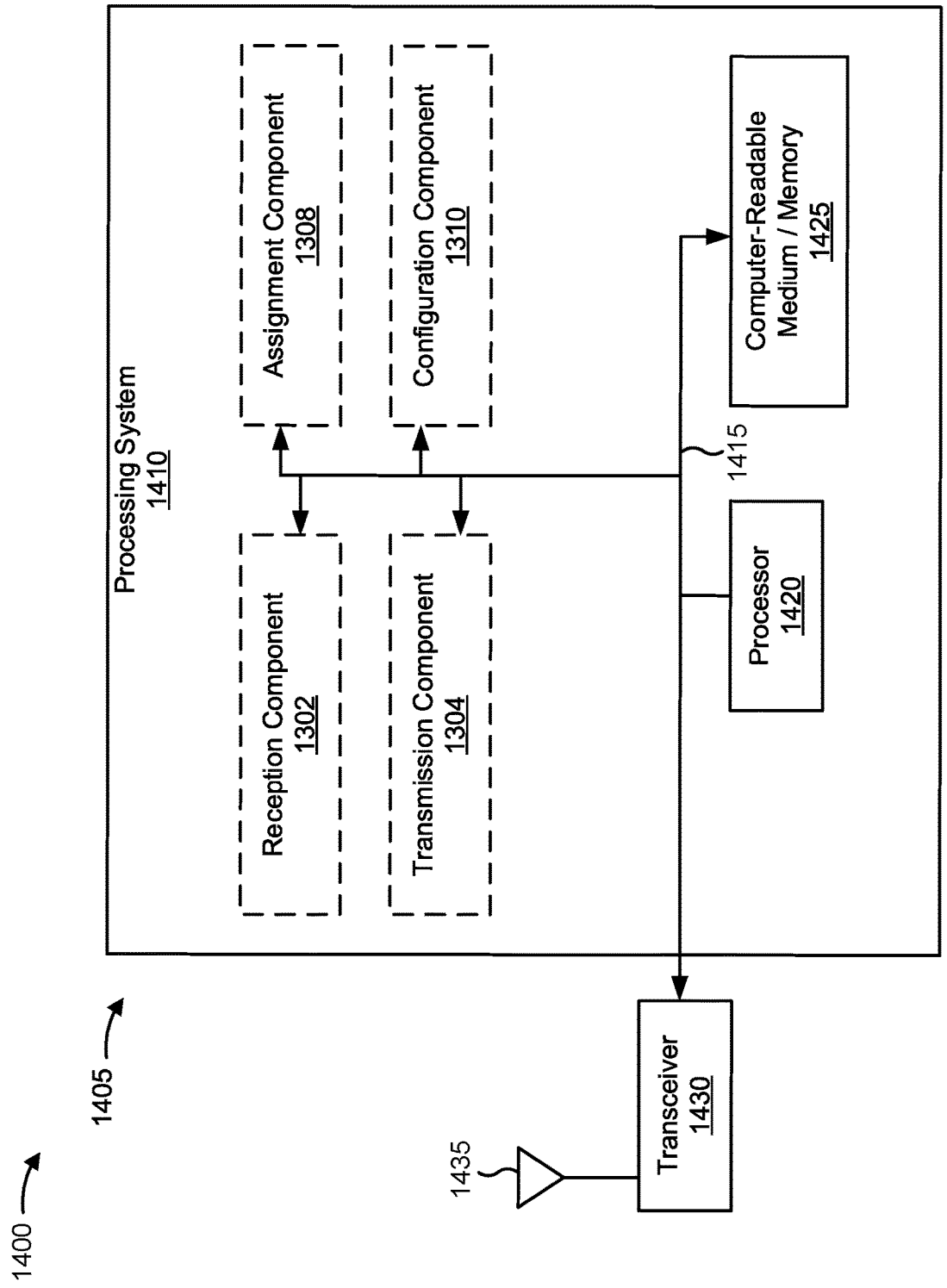
FIG. 14 is a diagram illustrating an example of a hardware implementation for an apparatus employing a processing system, in accordance with the present disclosure.

FIG. 14 is a diagram illustrating an example 1400 of a hardware implementation for an apparatus 1405 employing a processing system 1410. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, power management circuits, and/or the like.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication includes means for receiving, from a first user equipment (UE), a request associated with a sidelink resource allocation for a second UE; means for assigning the sidelink resource allocation for the second UE; means for transmitting scheduling information indicating the sidelink resource allocation to the first UE; and means for configuring the first UE to forward the scheduling information to the second UE. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
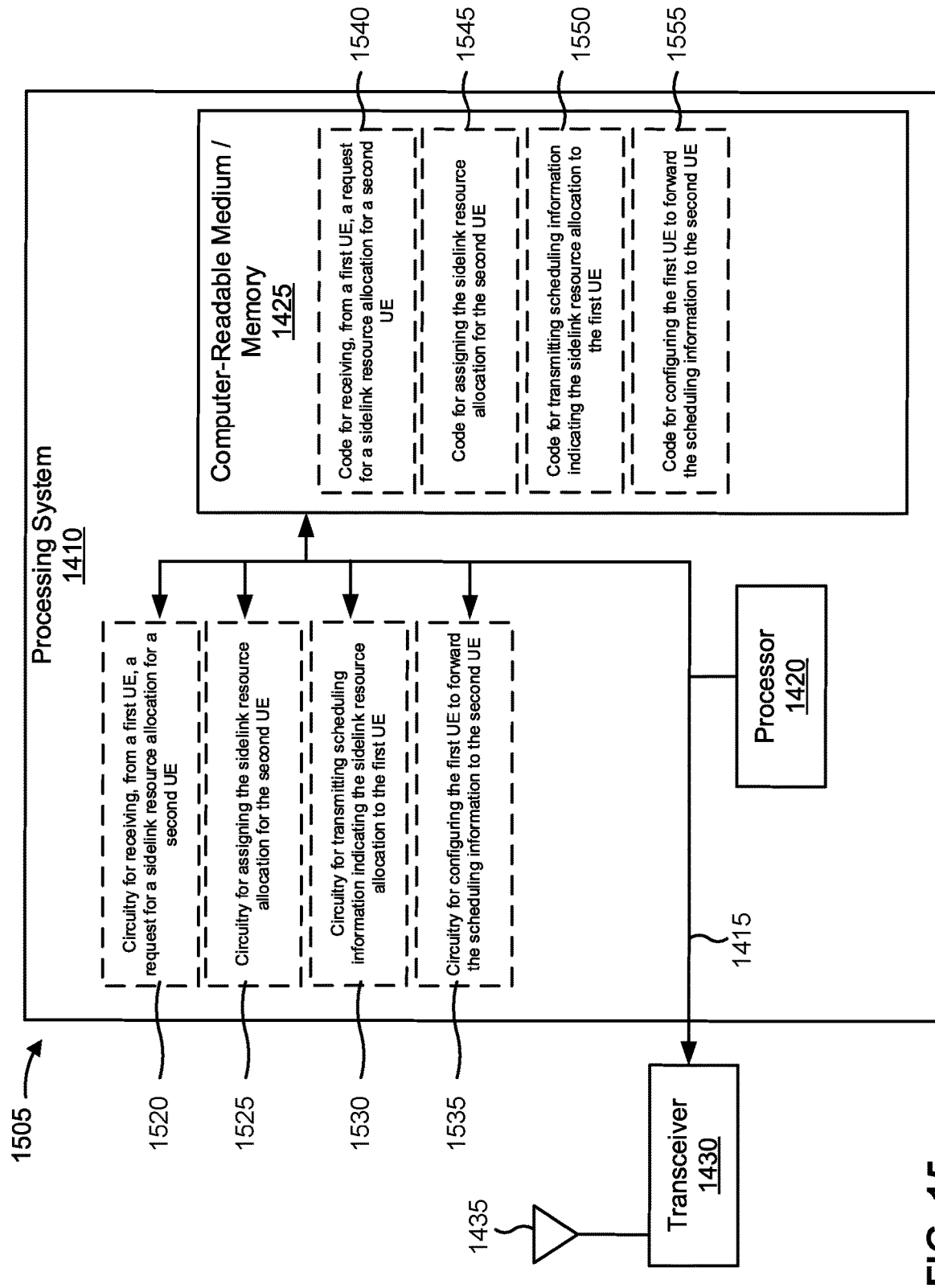
FIG. 15 is a diagram illustrating an example of an implementation of code and circuitry for an apparatus, in accordance with the present disclosure.

FIG. 15 is a diagram illustrating an example 1500 of an implementation of code and circuitry for an apparatus 1505. The apparatus 1505 may be a base station.

As further shown in FIG. 15, the apparatus may include circuitry for receiving, from a first UE, a request associated with a sidelink resource allocation for a second UE (circuitry 1520). For example, the apparatus may include circuitry to enable the apparatus to receive, from a first UE, a request associated with a sidelink resource allocation for a second UE.

As further shown in FIG. 15, the apparatus may include circuitry for assigning the sidelink resource allocation for the second UE (circuitry 1525). For example, the apparatus may include circuitry to enable the apparatus to assign the sidelink resource allocation for the second UE.

As further shown in FIG. 15, the apparatus may include circuitry for transmitting scheduling information indicating the sidelink resource allocation to the first UE (circuitry 1530). For example, the apparatus may include circuitry to enable the apparatus to transmit scheduling information indicating the sidelink resource allocation to the first UE.

As further shown in FIG. 15, the apparatus may include circuitry for configuring the first UE to forward the scheduling information to the second UE (circuitry 1535). For example, the apparatus may include circuitry to enable the apparatus to configure the first UE to forward the scheduling information to the second UE.

As further shown in FIG. 15, the apparatus may include, stored in computer-readable medium/memory 1425, code for receiving, from a first UE, a request associated with a sidelink resource allocation for a second UE (code 1540). For example, the apparatus may include code that, when executed by the processor 1420, may cause the transceiver 1430 to receive, from a first UE, a request associated with a sidelink resource allocation for a second UE.

As further shown in FIG. 15, the apparatus may include, stored in computer-readable medium/memory 1425, code for assigning the sidelink resource allocation for the second UE (code 1545). For example, the apparatus may include code that, when executed by the processor 1420, may cause the transceiver 1430 to assign the sidelink resource allocation for the second UE.

As further shown in FIG. 15, the apparatus may include, stored in computer-readable medium/memory 1425, code for transmitting scheduling information indicating the sidelink resource allocation to the first UE (code 1550). For example, the apparatus may include code that, when executed by the processor 1420, may cause the processor 1420 to transmit scheduling information indicating the sidelink resource allocation to the first UE.

As further shown in FIG. 15, the apparatus may include, stored in computer-readable medium/memory 1425, code for configuring the first UE to forward the scheduling information to the second UE (code 1555). For example, the apparatus may include code that, when executed by the processor 1420, may cause the processor 1420 to configuring the first UE to forward the scheduling information to the second UE.

FIG. 15 is provided as an example. Other examples may differ from what is described in connection with FIG. 15.

The following provides some example Aspects of the present disclosure:

Aspect 1: A method of wireless communication performed by a first user equipment (UE), comprising: transmitting, to a second UE, a request associated with a sidelink resource allocation and including a first set of parameters; and receiving, from the second UE and based at least in part on the first set of parameters, scheduling information indicating resources associated with the sidelink resource allocation and including a second set of parameters based at least in part on the request.

Aspect 2: The method of Aspect 1, wherein the first set of parameters comprises a one-bit indication.

Aspect 3: The method of any of Aspects 1-2, wherein the first set of parameters indicates one or more priority levels for one or more transmissions to be performed on the sidelink resource allocation.

Aspect 4: The method of any of Aspects 1-3, wherein the first set of parameters indicates one or more packet delay budgets for one or more transmissions to be performed on the sidelink resource allocation.

Aspect 5: The method of any of Aspects 1-4, wherein the first set of parameters indicates whether the sidelink resource allocation is to be periodic or aperiodic.

Aspect 6: The method of any of Aspects 1-5, wherein the first set of parameters indicates a number of retransmission occasions associated with the sidelink resource allocation.

Aspect 7: The method of any of Aspects 1-6, wherein the first set of parameters indicates whether hybrid automatic repeat request feedback is to be provided for a transmission on the sidelink resource allocation.

Aspect 8: The method of any of Aspects 1-7, wherein the first set of parameters includes a buffer status report for the first UE.

Aspect 9: The method of claim 8, wherein the buffer status report corresponds to one or more priority levels indicated by the first set of parameters.

Aspect 10: The method of any of Aspects 1-9, wherein the first set of parameters indicates an identifier of the first UE or an identifier of the second UE.

Aspect 11: The method of any of Aspects 1-10, wherein the first set of parameters identifies at least one of a carrier or a resource pool on which the sidelink resource allocation is to be selected.

Aspect 12: The method of any of Aspects 1-11, wherein the first set of parameters identifies a beam index of a beam to be used with regard to the sidelink resource allocation.

Aspect 13: The method of any of Aspects 1-12, wherein the second set of parameters indicates one or more time and frequency resource allocations of the sidelink resource allocation.

Aspect 14: The method of any of Aspects 1-13, wherein the second set of parameters indicates one or more periodicities for the sidelink resource allocation.

Aspect 15: The method of any of Aspects 1-14, wherein the second set of parameters indicates one or more channel busy ratio (CBR) values associated with the sidelink resource allocation.

Aspect 16: The method of claim 15, further comprising selecting a sidelink resource from the sidelink resource allocation based at least in part on the one or more CBR values.

Aspect 17: The method of any of Aspects 1-16, wherein the second set of parameters indicates at least one of an identifier of the first UE or an identifier of the second UE.

Aspect 18: The method of any of Aspects 1-17, wherein the second set of parameters indicates a suggested maximum modulation and coding scheme or a maximum number of layers for the sidelink resource allocation.

Aspect 19: The method of any of Aspects 1-18, wherein the second set of parameters indicates at least one of: one or more beam indexes of one or more beams to be used for the sidelink resource allocation, one or more carriers associated with the sidelink resource allocation, or a resource pool associated with the sidelink resource allocation.

Aspect 20: The method of any of Aspects 1-19, wherein the second set of parameters indicates whether a retransmission associated with the sidelink resource allocation is a retransmission or a feedback-based retransmission.

Aspect 21: A method of wireless communication performed by a first user equipment (UE), comprising: receiving, from a second UE, a request associated with a sidelink resource allocation to be selected by the first UE and including a first set of parameters; and transmitting, to the second UE and based at least in part on the first set of parameters, scheduling information indicating resources associated with the sidelink resource allocation and including a second set of parameters based at least in part on the request.

Aspect 22: The method of Aspect 21, wherein the first set of parameters indicates one or more priority levels for one or more transmissions to be performed on the sidelink resource allocation.

Aspect 23: The method of any of Aspects 21-22, wherein the first set of parameters indicates a number of retransmission occasions associated with the sidelink resource allocation.

Aspect 24: The method of any of Aspects 21-23, wherein the first set of parameters indicates whether hybrid automatic repeat first set of parameters feedback is to be provided for a transmission on the sidelink resource allocation.

Aspect 25: The method of any of Aspects 21-24, wherein the first set of parameters includes a buffer status report for the second UE.

Aspect 26: The method of Aspect 25, wherein the second set of parameters indicates one or more beam indexes of one or more beams to be used for the sidelink resource allocation.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, the one or more processors individually or collectively configured to cause the first UE to:
      transmit, to a second UE, a request indicating one or more priority levels for one or more transmissions, the request further indicating whether a sidelink resource allocation is to be periodic or aperiodic for the one or more priority levels; and
      receive, from the second UE and based at least in part on the request, scheduling information indicating resources associated with the sidelink resource allocation.

2. The first UE of claim 1, wherein the request includes a first set of parameters, the first set of parameters comprising a one-bit indication.

3. The first UE of claim 1, wherein the request further indicates one or more packet delay budgets for one or more transmissions to be performed on the sidelink resource allocation.

4. The first UE of claim 1, wherein the request further indicates a number of retransmission occasions associated with the sidelink resource allocation.

5. The first UE of claim 1, wherein the request further indicates whether hybrid automatic repeat request feedback is to be provided for a transmission on the sidelink resource allocation.

6. The first UE of claim 1, wherein the request includes a buffer status report for the first UE.

7. The first UE of claim 6, wherein the buffer status report corresponds to the one or more priority levels indicated by the request.

8. The first UE of claim 1, wherein the request further indicates an identifier of the first UE or an identifier of the second UE.

9. The first UE of claim 1, wherein the request identifies at least one of a carrier or a resource pool on which the sidelink resource allocation is to be selected.

10. The first UE of claim 1, wherein the request identifies a beam index of a beam to be used with regard to the sidelink resource allocation.

11. The first UE of claim 1, wherein the scheduling information further indicates one or more time and frequency resource allocations of the sidelink resource allocation.

12. The first UE of claim 1, wherein the scheduling information further indicates one or more periodicities for the sidelink resource allocation.

13. The first UE of claim 1, wherein the scheduling information further indicates one or more channel busy ratio (CBR) values associated with the sidelink resource allocation.

14. The first UE of claim 13, wherein the one or more processors are further configured to:
    select a sidelink resource from the sidelink resource allocation based at least in part on the one or more CBR values.

15. The first UE of claim 1, wherein the scheduling information further indicates at least one of an identifier of the first UE or an identifier of the second UE.

16. The first UE of claim 1, wherein the scheduling information indicates a suggested maximum modulation and coding scheme or a maximum number of layers for the sidelink resource allocation.

17. The first UE of claim 1, wherein the scheduling information further indicates at least one of:
    one or more beam indexes of one or more beams to be used for the sidelink resource allocation,
    one or more carriers associated with the sidelink resource allocation, or
    a resource pool associated with the sidelink resource allocation.

18. The first UE of claim 1, wherein the scheduling information further indicates whether a retransmission associated with the sidelink resource allocation is a retransmission or a feedback-based retransmission.

19. A first user equipment (UE) for wireless communication, comprising:
    one or more memories; and
    one or more processors, coupled to the one or more memories, the one or more processors individually or collectively configured to cause the first UE to:
        receive, from a second UE, a request indicating one or more priority levels for one or more transmissions, the request further indicating whether a sidelink resource allocation is to be periodic or aperiodic for the one or more priority levels; and
        transmit, to the second UE and based at least in part on the request, scheduling information indicating resources associated with the sidelink resource allocation.

20. The first UE of claim 19, wherein the request further indicates a number of retransmission occasions associated with the sidelink resource allocation.

21. The first UE of claim 19, wherein the request further indicates whether hybrid automatic repeat first set of parameters feedback is to be provided for a transmission on the sidelink resource allocation.

22. The first UE of claim 19, wherein the request includes a buffer status report for the second UE.

23. The first UE of claim 22, wherein the scheduling information further indicates one or more beam indexes of one or more beams to be used for the sidelink resource allocation.

24. A method of wireless communication performed by a first user equipment (UE), comprising:
    transmitting, to a second UE, a request indicating one or more priority levels for one or more transmissions, the request further indicating whether a sidelink resource allocation is to be periodic or aperiodic for the one or more priority levels; and
    receiving, from the second UE and based at least in part on the request, scheduling information indicating resources associated with the sidelink resource allocation.

25. A method of wireless communication performed by a first user equipment (UE), comprising:
    receiving, from a second UE, a request indicating one or more priority levels for one or more transmissions, the request further indicating whether a sidelink resource allocation is to be periodic or aperiodic for the one or more priority levels; and
    transmitting, to the second UE and based at least in part on the request, scheduling information indicating resources associated with the sidelink resource allocation.

26. The method of claim 24, wherein the request identifies at least one of a carrier or a resource pool on which the sidelink resource allocation is to be selected.

27. The method of claim 24, wherein the scheduling information further indicates whether a retransmission associated with the sidelink resource allocation is a retransmission or a feedback-based retransmission.

28. The method of claim 25, wherein the request identifies at least one of a carrier or a resource pool on which the sidelink resource allocation is to be selected.

29. The method of claim 25, wherein the scheduling information further indicates whether a retransmission associated with the sidelink resource allocation is a retransmission or a feedback-based retransmission.

30. The first UE of claim 1, wherein a first priority level of the one or more priority levels is to be associated with a periodic sidelink resource allocation, and a second priority level of the one or more priority levels is to be associated with an aperiodic sidelink resource allocation.

* * * * *